United States Patent [19]

Lubarsky et al.

[11] Patent Number: 5,058,163

[45] Date of Patent: Oct. 15, 1991

[54] INTERFACE UNIT FOR TRANSFERRING DIGITAL DATA BETWEEN TIME-DOMAIN MULTIPLEXED COMMUNICATION LINKS

[75] Inventors: Daniel P. Lubarsky, San Jose; George A. Weigt, Livermore; Mark E. Haisch, Freemont, all of Calif.

[73] Assignee: Pacific Bell, San Francisco, Calif.

[21] Appl. No.: 256,908

[22] Filed: Oct. 12, 1988

[51] Int. Cl.⁵ .......................... H04L 9/02; H04J 3/22; G06F 7/34
[52] U.S. Cl. ....................................... 380/49; 380/37; 380/50; 364/200; 364/238.2; 370/58.1; 370/60; 370/82; 370/84; 370/92; 371/2.1; 371/68.1; 379/94; 379/95; 379/165
[58] Field of Search .................. 380/49, 50, 36, 37; 370/9, 58, 60, 79, 82, 84, 87, 92; 371/2.1, 68.1; 379/94, 95, 165; 364/238, 238.2, 238.200 MS File

[56] References Cited

U.S. PATENT DOCUMENTS

| | | | |
|---|---|---|---|
| 4,133,973 | 1/1979 | Branscome et al. | 380/48 |
| 4,326,098 | 4/1982 | Bouricius et al. | 380/49 |
| 4,405,829 | 9/1983 | Rivest et al. | 380/49 |
| 4,531,020 | 7/1985 | Wechselberger et al. | 380/20 |
| 4,596,898 | 1/1986 | Pemmaraju | 380/49 |
| 4,771,462 | 9/1988 | Hannan et al. | 380/44 |
| 4,817,147 | 3/1989 | Gorniak et al. | 380/49 |

OTHER PUBLICATIONS

Dunbar, B. J., et al., "Dataport-Channel Units for Digital Data System 56-kb/s Rate", *The Bell Systems Technical Journal*, vol. 61, No. 9, Nov. 1982, pp. 2741-2756.
Albert, W. G., et al., "Digital Terminal Physical Design", *The Bell System Technical Journal*, vol. 61, No. 9, Nov. 1982, pp. 2756-2790.

Primary Examiner—Thomas A. Tarcza
Assistant Examiner—Linda J. Wallace
Attorney, Agent, or Firm—McCubbrey, Bartels, Meyer & Ward

[57] ABSTRACT

An apparatus for transferring digital data between time-domain multiplexed communication links of a telephone system which forms part of a computer network. A time-domain multiplexed communication link interface unit for transferring digital data between a first channel on a first time-domain multiplexed communication link and a second channel on a second time-domain multiplexed communication link of a multipoint communication network is disclosed. The multipoint communication network includes a plurality of network units with at least two of the network units comprising said time-domain multiplexed communication link interface units. The network units are coupled to telephone system communication links. The network units transmit and receive digital data in a frame mode in which the data is organized into frames on the communication links.

13 Claims, 7 Drawing Sheets

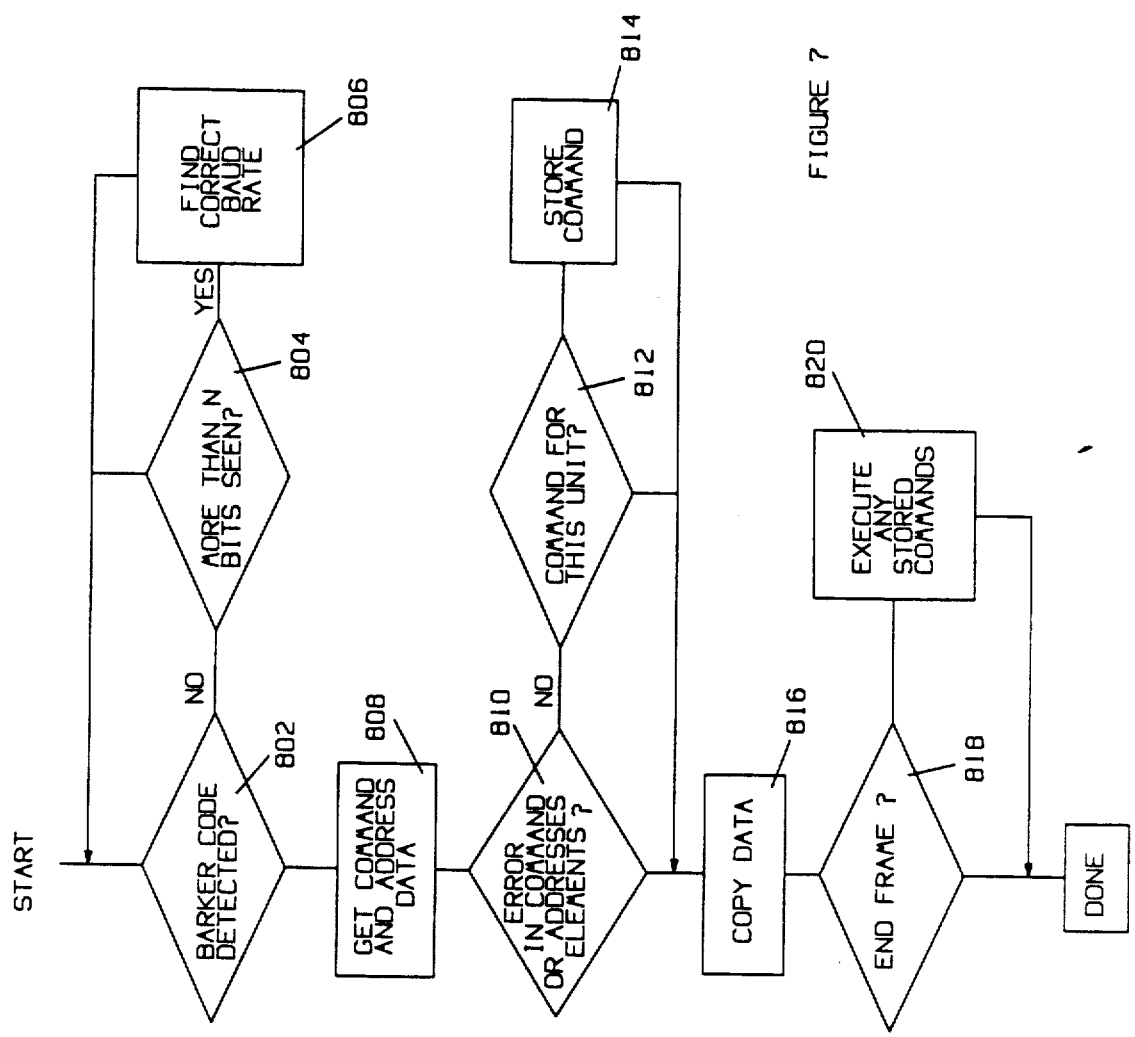

INTERFACE UNIT FOR TRANSFERRING DIGITAL DATA BETWEEN TIME-DOMAIN MULTIPLEXED COMMUNICATION LINKS

BACKGROUND OF THE INVENTION

The present invention relates to an apparatus for use in networks which connect a plurality of computers, and more particularly, to an apparatus for transferring digital data between time-domain multiplexed communication links of a telephone system that forms part of said computer network.

Many businesses have computer networks that extend over large geographic areas. The most economical manner for implementing such networks utilizes existing telephone lines to connect the various computers in the network. Computer networks that utilize the telephone system are known to the prior art. However, these computer networks are less than ideal. Problems arise from the use of transmission facilities that were designed for voice quality transmissions between two points, and from the inclusion of components that are owned and maintained by separate commercial entities. However, because of the cost savings inherent in the use of the existing telephone system, it is desirable, if at all possible, to adapt such network equipment for acceptable digital data transmission.

Existing computer networks suffer from a number of drawbacks. For example, prior art computer networks that utilize the telephone system are difficult to reconfigure both with regard to the speed at which data is transmitted within the telephone system and with regard to the topological configuration of the computer network. In prior art computer networks, telephone company technicians must be dispatched to various locations within the telephone system to effect a data rate change in the computer network. If the new data rate is not one of a small number of rates for which the equipment is designed, the actual interface circuitry within the telephone system must often be changed. As a result, it is practically impossible to change data rates in response to short-term changes in the quality of the telephone lines carrying the data.

Short-term increases in the noise on specific telephone lines are common. The telephone lines used for carrying the user's computer data are, in general, identical to the lines used to carry voice communications within the telephone system. These lines are bundled into cables with similar lines. The noise level on these lines depends upon a number of factors including the nature of the transmissions on the lines bundled with those used for the computer network.

To change the network speed or configuration, changes must be made in equipment that is neither owned nor maintained by the computer network owner. This makes reconfiguration of the network difficult, since telephone company personnel must be coordinated with those of the network owner.

Ideally, a network owner would like to be able to change the configuration of the network in response to observed error rates or the time of day. Such reconfiguration, for example, would be useful in smoothing peak loads on the computer network. Such reconfigurability would also be useful in transferring specific services to offices in earlier time zones when the office providing the service in another time zone closes at the end of the day. In prior art systems, such reconfiguration requires that key components of the computer network be rewired by telephone company personnel or that special purpose hardware be installed at significant cost.

Another example of a drawback in prior art computer networks is the inability of the user to monitor and manage the computer network. If a failure occurs in the computer network, it is difficult to ascertain whether the failure is the result of a malfunction in the equipment supplied by the telephone company, either on or off of the network owner's premises, or in the equipment owned and maintained by the network owner. Hence, when a malfunction is detected, telephone company technicians are often needed to ascertain the location of the failure within the system. The time delays inherent in such determinations are often unacceptable. It would be advantageous to provide a means for allowing the network user to set loopbacks and other diagnostic aids within the computer network without the time delays and added expense inherent when telephone company personnel must be involved. Similarly, the computer network user would like to be able to access data showing error rates on the various communication links in the computer network.

Within the telephone system, the computer data is often communicated on time-domain multiplexed communication links referred to as $T_1$ lines. Each $T_1$ line provides 24 time-domain multiplexed channels. In moving data between geographically distant points within the computer network, data must often be transferred from a first channel on one $T_1$ line to a second channel on a different $T_1$ line. This data transfer function is normally performed using the digital cross-connect switches which are located in various central offices within the telephone system.

Unfortunately, not all central offices have such cross-connect switches. When a computer network must shift data between different $T_1$ channels within such a central office, special $T_1$ interface circuits are utilized. These circuits allow data from a first $T_1$ channel to be transferred to and from a second $T_1$ channel either on the same $T_1$ line or on a different $T_1$ line. The present invention relates to such an interface circuit.

As noted above, error rates are a significant problem in computer networks that utilize voice quality communication links within the telephone system.

It has been found that one method of reducing errors on the various communication links within the computer network is to encrypt the data using an error correcting code prior to transmission. Hence, it would be advantageous to provide a switching unit that would function properly on error encrypted data.

Broadly, it is an object of the present invention to provide an improved $T_1$ interface circuit.

It is another object of the present invention to provide a $T_1$ interface circuit that allows the use of encrypted data to achieve an improved error rate.

It is yet another object of the present invention to permit modification of the topological configuration of the computer network without the necessity of rewiring or reconfiguring network hardware.

These and other objects of the present invention will become apparent to those skilled in the art from the following detailed description of the invention and the accompanying drawings.

SUMMARY OF THE INVENTION

The present invention comprises a time-domain multiplexed communication link interface unit for transferring digital data between a first channel on a first time-domain multiplexed communication link and a second channel on a second time-domain multiplexed communication link of a multipoint communication network. The multipoint communication network includes a plurality of network units with at least two of the network units comprising said time-domain multiplexed communication link interface units. The network units are coupled to telephone system communication links. The network units further transmit and receive digital data in a frame mode in which the data is organized into frames on the communication links. Each of the frames includes synchronization data, command data, error correcting data, and user data.

Each of the network units further comprises a means for storing an address identifying the network unit and a means for receiving commands from other network units in the computer network. The commands are specified by command data in the frame received by the network unit. The unit also includes a means for generating command data in response to a received command included in the command data and a means for transmitting commands to other network units in the computer network. The transmitting means itself includes a means for inserting command data generated by the command data generating means into the frame transmitted by the network unit. The network unit additionally includes a means for executing the received command specifying the stored address as the target thereof.

The time-domain multiplexed communication link interface unit further comprises a first input port means coupled to the incoming portion of the first channel for receiving a primary channel word. The first input port means further comprises a first decrypting means for generating a data word corresponding to each received primary channel word. Each generated data word itself comprises a portion of the frame. The time-domain multiplexed communication link interface unit also includes first output port means coupled to the outgoing portion of the first channel for transmitting a data word. The first output port means further comprises a first encrypting means for generating a primary channel word from the received data word and for transmitting the generated primary channel word on the outgoing portion of first channel.

A second output port means for transmitting each data word generated by the first input port means on the outgoing portion of a central office communication link is likewise provided. The time-domain multiplexed communication link interface unit includes a second input port means for receiving a data word on the incoming portion of the central office communication link and coupling the data word to the first output port means.

BRIEF DESCRIPTION OF THE DRAWINGS

FIG. 7 is a flow chart of the command execution cycle of the microprocessor monitoring the data leaving the input port of a master data port.

DETAILED DESCRIPTION OF THE INVENTION

The time-domain multiplexed communication link interface unit to which the present invention is directed is best understood with reference to networks in which the apparatus attains its advantages. Hence, before proceeding with a detailed explanation of the time-domain multiplexed communication link interface unit, hereinafter referred to as the "$T_1$ interface unit," a discussion of a simple computer network utilizing the $T_1$ interface unit will be given.

Figure 1:
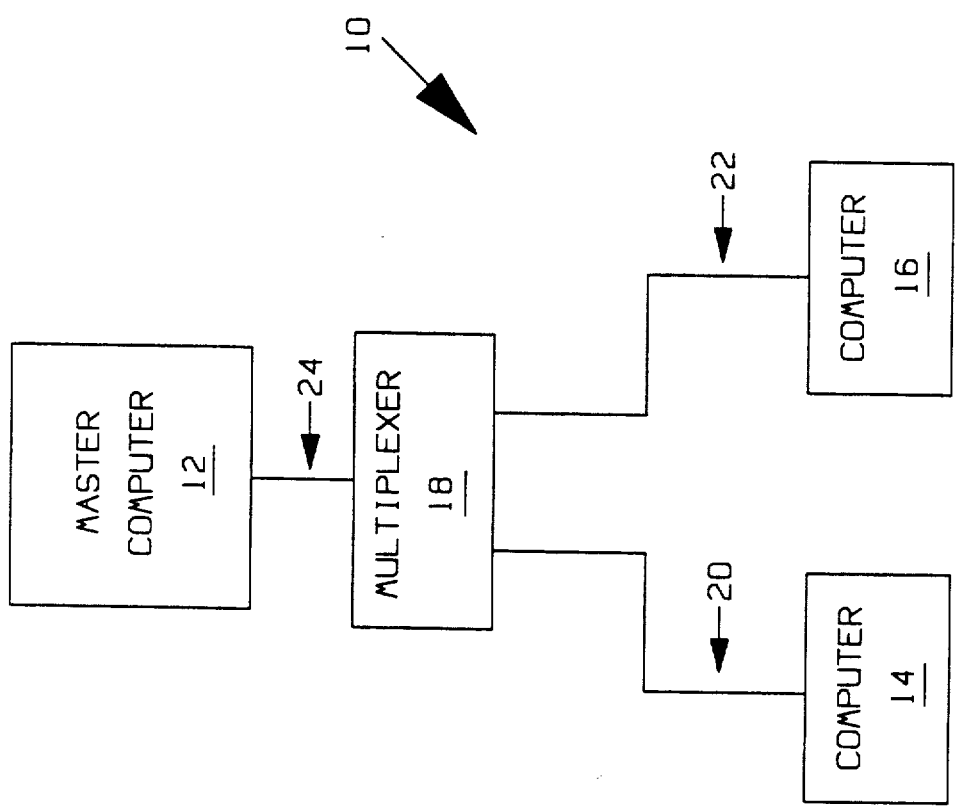
FIG. 1 is a block diagram of a simple computer network.

An example of a simple computer network 10 is shown in FIG. 1. Computer network 10 includes three computers 12, 14, and 16. Computer 12 is the master computer. Computers 14 and 16 are remote or slave computers which communicate with master computer 12 under the control of master computer 12.

A multiplexer 18 transmits each command from master computer 12 on a communication link 24 to both of the slave computers by copying each command input to it on communication link 24 to branch communication links 20 and 22. Hence, each slave computer receives all commands transmitted by master computer 12. Each such command is addressed either to both of the slave computers or to a specified one of them. Each slave computer is programmed to respond only to those commands directed to it.

Multiplexer 18 combines the data streams sent by each of the slave computers 14 and 16 on communication links 20 and 22, respectively. The "combining" operation is typically an ORing of the data in each data stream. The combined data is then transmitted to master computer 12 on communication link 24. Hence, slave computers 14 and 16 must be programmed to respond to commands from master computer 12 one at a time. This is normally accomplished by using a polling protocol. Master computer 12 sends a command to one of the slave computers requesting information. The slave computer in question then responds. The other slave computer is programmed to be silent during this response.

Figure 2:
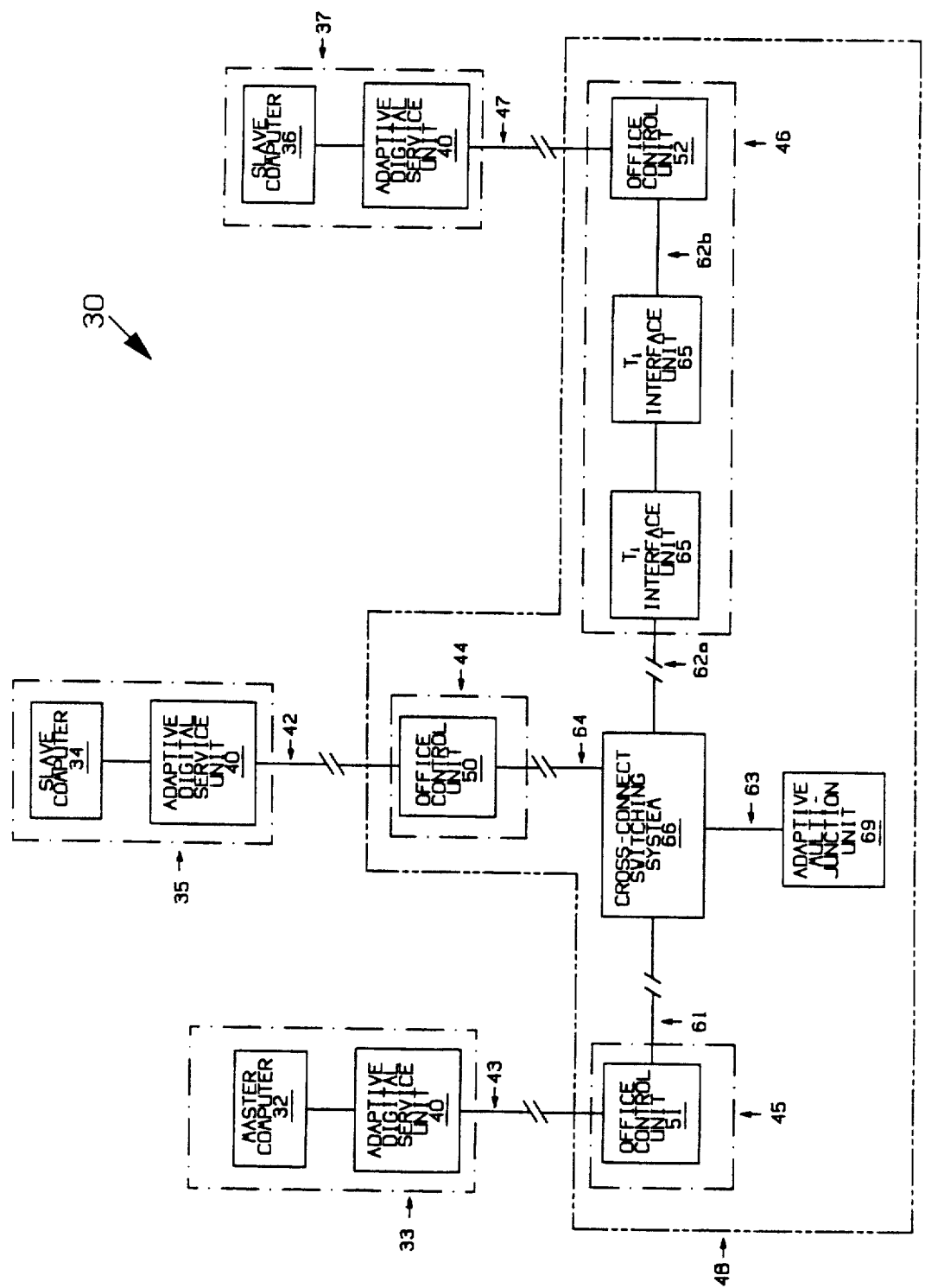
FIG. 2 is a block diagram of a telephone system based implementation of the computer network shown in FIG. 1.

A block diagram of a telephone system based implementation of computer network 10 is shown in FIG. 2 at 30. Computer network 30 includes a master computer 32 at location 33, a slave computer 34 at location 35, and a slave computer 36 at location 37. Each computer sends data to and from a first network component referred to as an adaptive digital service unit 40 located on the same premises as the computer in question. Data is communicated between the adaptive digital service unit 40 and the computer connected thereto in a standard digital format such as RS-232.

The various adaptive digital service units of the network format the computer data for transmission to and from a telephone system central office over a pair of conventional subscriber loops of the type used for normal voice communications. In computer network 30, master computer 32 communicates with central office 45 over subscriber loops 43. Similarly, slave computer 34 communicates with central office 44 over subscriber loops 42, and slave computer 36 communicates with central office 46 over subscriber loops 47. To clarify FIG. 2, each pair of subscriber loops is shown as a single communication path in the figure. However, it is to be understood that each such path comprises two subscriber loops, one for transmitting data in each direction relative to the central office. The central offices in question are all part of a telephone system 48.

Each pair of subscriber loops terminates on a second network component referred to as an adaptive office control unit. In computer network 30, subscriber loops 42, 43, and 47, terminate on adaptive office control units 50, 51, and 52, respectively. The adaptive office control units reformat the data on the subscriber loops connected thereto to a format compatible with conventional $T_1$ communication links within telephone system 48. Exemplary $T_1$ communication links are indicated at 61-64.

Computer network 30 also includes an adaptive multijunction unit 69, a third type of network unit which performs functions analogous to multiplexer 18 shown in FIG. 1. The adaptive multijunction unit 69 copies the data input to it on a specified set of channels of $T_1$ communication link 63 which are assigned to adaptive office control unit 51 to a set of channels on $T_1$ communication link 63 which are assigned to adaptive office control units 52 and 50. In addition, adaptive junction unit 69 ORs the data input to it on the $T_1$ channels assigned to adaptive office control units 50 and 52 and transmits the ORed data on the channels assigned to office control unit 51.

Telephone system 48 includes a cross-connect switching system 66 which is utilized for routing data between the $T_1$ channels of the various $T_1$ communication links. For example, cross-connect system 66 routes the data placed in preassigned channels of $T_1$ communication link 61 by office control unit 51 to the appropriate channels of $T_1$ communication link 63 where it is operated on by adaptive multijunction unit 69. Cross-connect system 66 is constructed from a number of cross-connect switches located at different geographic locations within telephone system 48; for simplicity, it is shown as a single block in the figure.

However, as noted above, some geographic locations do not have on-site access to cross-connect switches. Such a geographic location or central office is shown at 46 in FIG. 2. Because central office 46 does not have a cross-connect switch on site, $T_1$ interface units 65 are installed to serve the same function in the network as would a conventional cross-connect switch. $T_1$ communication links 62a and 62b are connected to the interface units 65 which route the data between the appropriate channels of the $T_1$ communication links.

In addition to communicating data to and from the various computers in the computer network, the adaptive digital service units, adaptive office control units, adaptive multijunction units, and $T_1$ interface units communicate with each other to affect a number of useful network management functions. In one sense, a computer network utilizing the present invention comprises two computer networks. The first computer network consists of the user's computers, i.e., master computer 32 and slave computers 34 and 36 shown in FIG. 2. The second network consists of the adaptive digital service units, adaptive office control units, adaptive multijunction units, and $T_1$ interface units. The elements of this second network communicate with each other over the same telephone lines used by the computers in the first network. This second computer network will be referred to as the telephone system computer network in the following discussion.

Each of the elements in the telephone system computer network includes an onboard dedicated computer which will be referred to as a process and control circuit to distinguish it from the computers in the user's computer network. These process and control circuits send and receive instructions and data to and from each other on the same communication links used for transmitting data between the various computers in the computer network. These process and control circuits are also responsible for monitoring and, in some cases, taking actions which correct and/or reduce transmission errors within the telephone system computer network.

The communication links used in the present invention are designed for carrying voice-quality data. Digital data of the type communicated in a computer network requires a much lower error rate than voice data. The error rates in question may depend on other data being transmitted on adjacent lines in the telephone system, and hence, can vary with the time of day and other environmental factors. The various network units include circuitry for correcting some of the transmission errors. In addition, all of the process and control circuits are coupled to circuitry which monitors error rates on the communication links connected thereto and reports those error rates to other network units, which may then take action to reduce the error rates by sending commands to the various process and control circuits throughout the network.

A computer network utilizing the present invention provides superior error-related network management features which maximize the data throughput of the telephone system computer network while keeping error rates at acceptable levels. For example, the process and control circuits may be used to change the rate at which data is transmitted within the telephone system computer network. By adjusting the data rates, transmission errors resulting from noise are often significantly reduced.

In prior art systems, data transmission rates could only be changed by sending technicians to the various geographic areas within the telephone system. Furthermore, changing the data rates often required replacing the equipment within the system. Hence, the data rates could not be optimally adjusted in response to transitory conditions having a relatively limited time span. As a result, the data rates were often set at values significantly below the maximum data rates which could be sustained over the majority of the network operation hours. In a computer network utilizing the present invention in conjunction with the adaptive office control units and adaptive digital service units described herein, the data transmission rates can be automatically reduced when unsatisfactory error rates are observed and then automatically increased when the conditions causing the increased error rates subside. Thus, the mean data transmission rate in a computer network utilizing the present invention is significantly higher than that obtained in prior art networks.

The manner in which the present invention operates requires a knowledge of the various data formats and communication protocols utilized in a computer network which employs the present invention. The computer network in question communicates in two data formats which will be referred to as the framed and unframed formats. The framed format which is utilized at transmission rates below 64 Kbits/sec will be described first.

Figure 3:
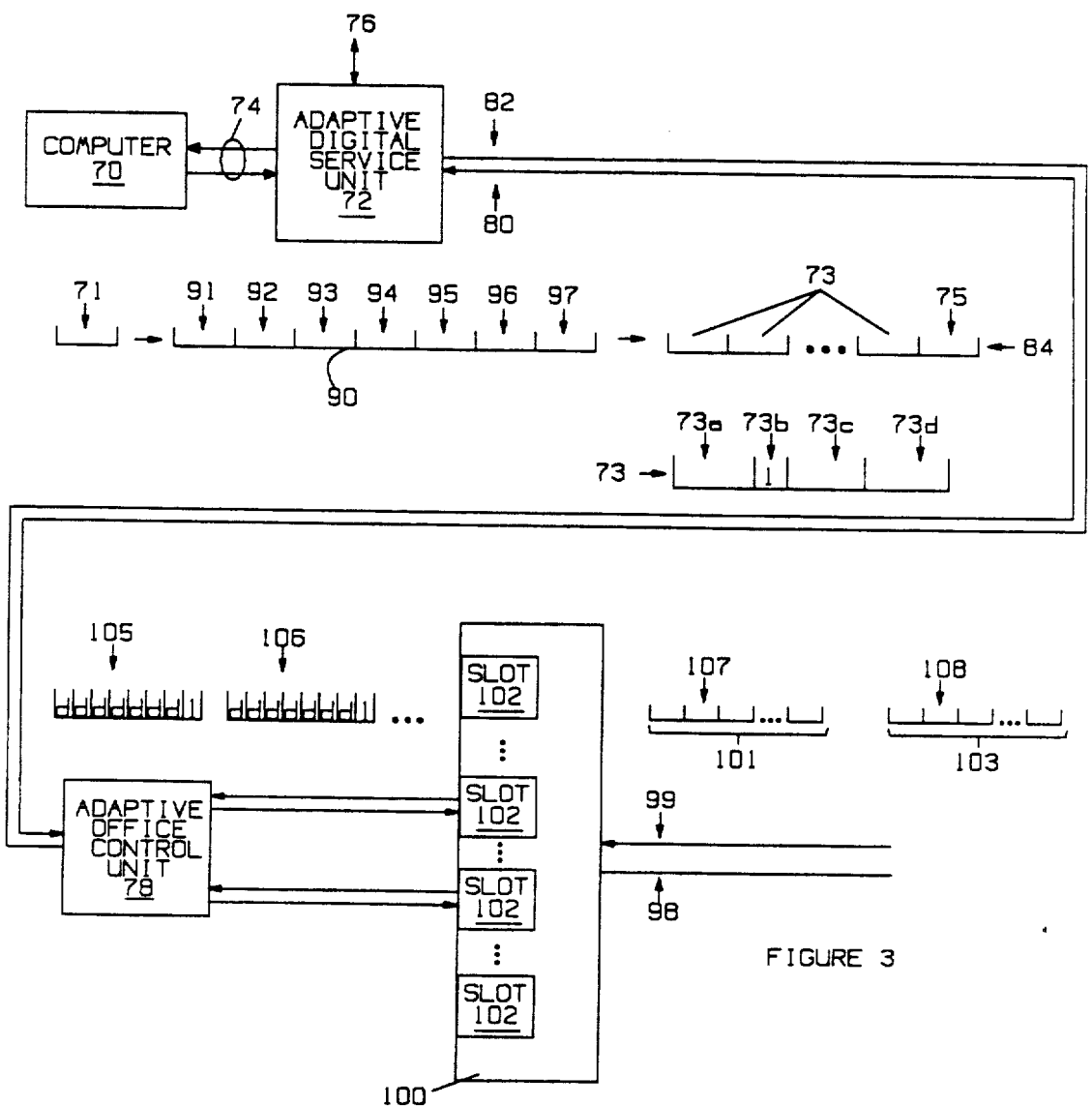
FIG. 3 illustrates the formatting of data transferred between a user's computing equipment and telephone company $T_1$ communication links.

FIG. 3 illustrates an interface between the user's computing equipment and a $T_1$ communication link via two subscriber loops. A user's computer 70 communicates with an adaptive digital service unit 72 according to the present invention over a serial communication line 74 which links other computers in the user's computer network through the telephone system. The user may also communicate with the various elements of the telephone system computer network through a command port 76 in adaptive digital service unit 72. Adaptive digital service unit 72 communicates with an adaptive office control unit 78 over two subscriber loops 80 and 82. Subscriber loop 82 is used to send data to adaptive office control unit 78, and subscriber loop 80 is used to receive data from the adaptive office control unit. Communications on subscriber loops 80 and 82 are in a synchronous protocol which utilizes a clock within the telephone system for timing. When computer 70 communicates with adaptive digital service unti 72 in a synchronous protocol, it also uses this clock.

Data is communicated between computer 70 and adaptive digital service unit 72 in bytes, e.g., 8-bit words. A typical data byte is shown at 71. Adaptive digital service unit 72 accumulates a number of data bytes from computer 70 before transmitting the data to adaptive office control unit 78 on subscriber loop 82. The data may be transferred in either the framed or unframed mode, with the latter allowing a higher data transmission rate.

When utilizing the framed mode, the data communicated between adaptive digital service unit 72 and adaptive office control unit 78 is preferably formatted in 560-bit packets which will be referred to as frames. Each frame includes user data plus additional "overhead" or "system" data used by the process and control circuits of the various network units. The additional data includes synchronization data, command data, and error correcting data. A typical frame 84 is constructed from 17 32-bit elements 73 and a 16-bit block 75. Each element 73 contains four fields. The first field 73a consists of 16 data bits. The second field 73b consists of a "1" used to maintain synchrony within the telephone system. The third field 73c consists of 10 more data bits and the fourth field 73d consists of 5 bits used for detecting and correcting transmission errors. The 5 bits in question will be referred to as either an ECC word or ECC/CRC bits for reasons which will be discussed in detail below.

Each frame is created from a loop interface data frame which is also produced within adaptive digital service unit 72. The loop interface frame is shown at 90 in FIG. 3. Loop interface frame 90 consists of 7 fields. The first field 91 consists of a 16-bit synchronization word which is used to achieve and maintain system synchronization. This field is preferably equal to 1FD0 in hexadecimal, and is referred to as the Barker sychronization code.

The second field 92 consists of a 16-bit command word which is used to signal the various process and control circuits in the telephone system computer network. The functions specified by this command word will be discussed in detail below. The third field 93 consists of a 16-bit address word identifying the device in the telephone system computer network to which the command in field 92 is directed.

The fourth field 94 consists of an 8-bit rate word which is used to communicated user data in an asynchronous transmission mode.

The fifth field 95 is a 2-bit signal word. One of these bits is used for security purposes, and the other specifies the number of user data bits which are actually being communicated in the frame.

The sixth field 96 contains the bulk of the user data, i.e., the data being communicated between the computers of the user's computer network. This field contains 384 bits.

Finally, the seventh field 97 contains a 16-bit word used to implement a secondary low-speed communication channel.

Adaptive digital service unit 72 accumulates data bytes 71 from computer 70 in a FIFO buffer. Data is read from this buffer to create frame 84. The number of bits read from this buffer depends on the speed at which the network is running and whether the computer network is running in a synchronous or asynchronous mode.

Adaptive digital service unit 72 also stores any commands input on command port 76 until adaptive digital service unit 72 is ready to send the next frame 84 on subscriber loop 82. The time at which frames 84 are sent on subscriber loop 82 is determined by clock signals communicated to adaptive digital service unit 72 on subscriber loop 80.

The loop interface frame 90 is converted to frame 84 by the bitwise copying of successive data bits from loop frame 90 into the data-bit fields of the elements of frame 84. The first element of frame 84 contains the 16 bits of the first field 91 of loop frame 90, followed by a "1", followed by the first 10 bits of the second field 92, followed by 5 ECC/CRC bits which are generated from the 26 bits of the first two fields using a conventional error correcting code. The added "1" guarantees that there is a sufficient density of one bits on the subscriber loops to maintain synchrony between the adaptive digital service unit and the adaptive office control unit connected thereto.

The second element of frame 84 contains the last 6 bits of command field 92 plus 10 bits of address field 93, followed by a "1", followed by the last 6 bits of field 93 plus the first 4 bits of rate field 94, followed by the 5 ECC/CRC bits for the second element. Successive elements of frame 84 are generated in a like manner.

Frame 84 ends with an eighteenth element comprising the 16 bits of field 97. No ECC/CRC bits are calculated for this last 16-bit field.

Frame 84 is transmitted by the adaptive digital service unit 72 to adaptive office control unit 78 on subscriber loop 82. The speed at which data is sent on subscriber loops 80 and 82, referred to as the loop speed, depends on the data rate between computer 70 and adaptive digital service unit 72, as well as on the communication protocol being used, i.e., framed or unframed. The relationship between the loop speed and the data rate in the preferred embodiment of the present invention is shown in Table I.

TABLE I

| Data Rate (Kbits/sec) | Data Bits | Loop Speed (Kbits/sec) |
|---|---|---|
| 1.2 | 192 | 3.5 |

TABLE I-continued

| Data Rate (Kbits/sec) | Data Bits | Loop Speed (Kbits/sec) |
|---|---|---|
| 2.4 | 384 | 3.5 |
| 4.8 | 384 | 7.0 |
| 9.6 | 384 | 14.0 |
| 19.2 | 384 | 28.0 |
| 32.0 | 320 | 56.0 |
| 38.4 | 384 | 56.0 |

The loop speed, i.e., the speed of data rate transmission over the subscriber loops, is higher than the data rate at which the customer's digital processing equipment transmits data to the adaptive digital service unit, because of the additional data added to the customer's data. The preferred network provides data transmission at data rates typically ranging between 1.2 and 64 Kbits/sec. For example, the data rates provided in a practical embodiment include 1.2, 2.4, 4.8, 9.6, 19.2, 32, and 38.4 Kbits/sec in the framed mode. A data rate of 64 Kbits/sec is supported in the unframed mode described below.

As noted above, the number of user data bits that are inserted into frame 84 by adaptive digital service unit 72 depends on the data rate. The number of user data bits so inserted is also shown in Table I. At those data rates for which less than 384 bits are accumulated, the remaining bits of field 96 are loaded with ones. At a data rate of 1.2 Kbits/sec, the remaining 192 bits can be loaded with a copy of the 192 user data bits accumulated from computer 70 instead of ones. This second copy of the user's data provides an additional error correcting capability.

Adaptive office control unit 78 transforms frame 84 into a format compatible with a $T_1$ communication link within the telephone system. The $T_1$ communication links in the telephone system consist of two communication paths. The first path 98 is used to transmit data and the second path 99 is used to receive data. Data is transmitted on these paths in 24 time-domain multiplexed channels. Each channel operates at a fixed rate of 64 Kbits/sec. The data is communicated in 24-byte $T_1$ frames, one byte of each frame corresponding to each time channel. Typical frames are shown in FIG. 3 at 101 and 103.

The interface between the individual channels and the $T_1$ communication links is accomplished by a conventional channel bank 100 which includes 24 "slots" 102. Each slot provides a means for sending data to and receiving data from a specified $T_1$ channel. In the preferred embodiment of a computer network utilizing the present invention, two of these slots are utilized by each adaptive office control unit for transmitting frame 84. However, as will be explained in detail below, if a user wishes to purchase only a subset of the error correcting features of the telephone system computer network, only one of these slots is made available. To simplify the following discussion, it will be assumed that only one of these slots is utilized unless otherwise specified.

At a loop speed of 56 Kbits/sec, adaptive office control unit 78 copies frame 84 into the first of these reserved $T_1$ channels by copying successive 7-bit segments of said frame on the $T_1$ channel during the time period reserved for the $T_1$ channel in question. Each 7-bit segment is augmented by adding one "1" bit to form an 8-bit byte. This byte is then copied to the $T_1$ channel. Two successive bytes created by adaptive office control unit 78 are shown at 105 and 106 respectively. The "d" indicates a data bit and the "1" indicates the inserted one bit. Bytes 105 and 106 are copied to the $T_1$ channels shown at 107 and 108 respectively.

The added one bit assures that there is sufficient density of ones on the $T_1$ communication link to maintain the synchronization of the $T_1$ system. $T_1$ communication links are used to transmit data over long distances. Hence, they must utilize one or more repeaters. These repeaters must be synchronized to assure the overall synchrony of the $T_1$ system. The repeaters in question utilize transitions between "1" and "0" bits to maintain synchrony. As a result, a long sequences of "0" bits are to be avoided. By adding one "1" per byte, each office control unit assures that the minimum density of "1" bits is always present. As noted above, the data rate of a $T_1$ channel is 64 Kbits/sec. The added "1" bit transmitted with each 7 bits of frame data brings the 56 Kbits/sec loop speed up to 64 Kbits/sec which exactly matches the capacity of a $T_1$ channel.

When the loop speed is less than 56 Kbits/sec, i.e., 28 Kbits/sec, 14 Kbits/sec, 7 Kbits/sec or 3.5 Kbits/sec, the $T_1$ channel is capable of transmitting more data then the telephone system computer network is receiving. In a computer network utilizing the present invention, this added capacity may be utilized for error correction by repetitively transmitting each data byte. The additional copies of the byte are transmitted in successive $T_1$ frames immediately after the $T_1$ frame containing the first copy. When the loop speed is 14 Kbits/sec, each byte is transmitted four times in successive $T_1$ frames, and so on.

Adaptive office control unit 78 also receives data from the $T_1$ channel connected thereto on line 99. When two copies of the transmitted byte are received by an adaptive office control unit 78, the unit checks for errors by noting disagreement between the two bytes, and one of the bytes is selected for output. If the number of copies of each byte is greater than two, an adaptive office control unit 78 receiving the data on the $T_1$ channel can correct for some errors that occur on a channel level, i.e., during transmission of the bytes between network units which communicate on the $T_1$ communication links. Such network units utilize conventional majority decision algorithms in addition to detecting and reporting errors. If only two copies of the transmitted bytes are present, and the copies are not identical, the receiving adaptive office control unit 78 only notes an error. Errors which are detected using the 5 ECC/CRC bits are also noted by adaptive office control unit 78. As will be explained below, such error information may be accessed from network units to aid in diagnosing system failures and taking corrective measures.

When "$T_1$ formatted" data bytes are received in an adaptive office control unit, the added "1" bit is stripped and the original frame is reconstructed. This frame is transmitted to adaptive digital service unit 72 on subscriber loop 80. Those errors that can be corrected using the abovementioned majority decision algorithm are corrected; however, no attempt is made to correct errors in user data utilizing the 5 error correcting bits included in each element 73. Rather, errors that can be so corrected are corrected by adaptive digital service unit 72 when it receives the frame. Errors detected using the 5 ECC/CRC bits are, however, noted.

Upon receiving a frame, adaptive digital service unit 72 unpacks the frame elements 73 and corrects for any errors that can be corrected using the 5 error correcting bits. Adaptive digital service unit 72 then separates the user data from the command data. The user data is then transmitted to computer 70 on serial communication link 74. Any commands intended for adaptive digital service unit 72 are executed by adaptive digital service unit 72.

The adaptive digital service unit which is connected to the master computer in the user's computer network will be referred to herein as the master adaptive digital service unit. The adaptive digital service units connected to the slave computers in the user's computer network will be referred to as the slave adaptive digital service units. If a slave adaptive digital service unit notes errors, it keeps track of these errors. If the error rate exceeds a predetermined threshold value, the slave adaptive digital service unit in question reports an error condition to the master adaptive digital service unit using one of the commands transmitted in field 92 of the loop frame.

If the adaptive digital service unit is a master adaptive digital service unit, it may send commands to the process and control circuits in the telephone system computer network which cause the speed of the computer network to be reduced. These commands are also sent in field 92. By reducing the speed of the telephone system computer network, error rates may be significantly reduced for two reasons. First, reducing the speed at which subscriber loops 80 and 82 operate substantially reduces the error rates on these communication links. Second, as noted above, majority decision algorithms can be used to correct $T_1$ channel-level errors on the $T_1$ communication links at lower data rates.

As noted above, the present invention also supports a communication mode in which user data is transmitted at 64 Kbits/sec. Such high-speed data transfer capabilities are increasingly sought to implement high-speed computer networks. Since the effective bandwidth of subscriber loops 80 and 82 does not permit data transfer at rates greater than 64 Kbits/sec, there is insufficient bandwidth to permit data transfer using the loop frame format described above. As a result, error checking and correction on the subscriber loop links is not available in this communication mode. However, error detection and correction can be provided on the data paths utilizing $T_1$ communication links.

When operating in the unframed format, 64 Kbits/sec communication mode, adaptive digital service unit 72 receives, 8-bit data bytes from computer 70 and transmits data in 9-bit words on subscriber loop 82. Each 9-bit word consists of the 8 bits transmitted by computer 70 and a "1". The added "1" is utilized for maintaining synchrony on subscriber loops 80 and 82. Upon receipt by adaptive office control unit 78, the added "1" is stripped, and the 8-bit data byte is transmitted using an error correcting code to correct for transmission errors on the $T_1$ communication links.

As noted above, the $T_1$ communication links are designed for carrying voice-quality data. As a result, the transmission error rates over these communication links are often too great to allow satisfactory transmission of computer data. To reduce the effective error rates on the $T_1$ communication links, both of the $T_1$ channels mentioned above are utilized together with an error correcting code. At lower transmission speeds, such error correction is not so critical, since the insertion of error codes and error correction utilizing these codes are performed by the adaptive digital service units.

However, additional error correction may still be desirable. At the 64 Kbits/sec data rate, these adaptive digital service unit functions are not available; hence, this added error correction is almost always needed.

Conventional error correcting codes are well known in the computer and telephone arts. Hence, these codes will not be discussed in detail here. For the purposes of this discussion, an error correcting code will be defined as a transformation of a D-bit data word to an encrypted Q-bit data word, where $Q > D$ and wherein the transformation that decrypts the Q-bit encrypted data word corrects for errors resulting from alterations caused by as many as N bits being picked up or dropped during transmission over the $T_1$ communication links. Here, N is a function of the particular code chosen. In general, codes having higher ratios of Q to D have higher N values.

In the present invention, D is preferably equal to 8; hence, Q must be greater than 8. As noted above, a single $T_1$ channel provides a 64 Kbits/sec data communication facility. Since the user data is arriving at adaptive office control unit 78 at 64 Kbits/sec in the unframed mode, and since more than 8 bits must be sent for each 8 bits received, it follows that more than one $T_1$ slot must be utilized. As noted above, each adaptive office control unit 78 is connected to two slots in the $T_1$ channel bank. The above discussion assumed that only one of these slots was utilized. When additional error correction on the $T_1$ communication links is desired, e.g., at the 64 Kbits/sec data rate, both slots are utilized. Since two $T_1$ channels are utilized, the optimum value for Q is 16. Hence, the present invention utilizes a 16-bit error correcting code. That is, each 8-bit user data word is encrypted to form a 16-bit encrypted word which is then divided into two 8-bit transmission words, one such transmission word being transmitted over each of the two $T_1$ channels coupled to adaptive office control unit 78.

Similarly, adaptive office control unit 78 receives two data words from the incoming channels of the channel bank and converts those two words to a 16-bit encrypted word which is then decrypted to form an 8-bit data word which is used to generate the data transmitted on subscriber loop 80. If the computer network is operating in the framed mode, the added "1" is stripped from the 8-bit data word. If the computer network is operating in the unframed mode a "1" is added.

In addition to the properties mentioned above, the error correcting code used for correcting errors on the $T_1$ communication links preferably includes one additional property. As noted above, the $T_1$ communication links include repeaters which enable the signals thereon to be transmitted over long distances. These repeaters must remain synchronized. The synchronization is accomplished by observing transitions between "1" and "0" bits on the communication links. Hence, a minimum density of "1" bits is needed. At lower transmission rates, this density was provided by sending 7 data bits and a "1" in each $T_1$ channel. At 64 Kbits/sec, this solution is not possible, since there is insufficient bandwidth on the $T_1$ communication links to transmit the additional "1". As a result, the preferred error correcting code is one which guarantees that each of the 8-bit transmission words has at least one "1".

The preferred error correcting code used in the adaptive office control units and the $T_1$ interface units according to the present invention differ from conventional error correcting codes which do not provide at least one "1" in each 8-bit transmission word. In conventional error correcting codes at least one of the transmission words is 0 for some value of the 8-bit user data word. As a result, conventional error correcting codes are unsatisfactory for use in the 64 Kbits/sec mode of a computer network utilizing the present invention. The preferred error correcting code is, however, derived from a conventional error correcting code by a transformation that is easily implemented in electronic circuitry and that preserves the full error correcting capability of the conventional error correcting code.

When the $T_1$ error correcting feature is operative, an 8-bit data word which is to be sent over a $T_1$ communication link is encrypted as follows. First, the 8-bit user data word is encrypted with a conventional cyclic error correcting code shown in Table II to form two encrypted 8-bit words $^1X$ and $^2X$. The error correcting code shown in Table II is a conventional (16, 8) BCH code in which the 16-bit encrypted data word has been broken into two 8-bit data words.

TABLE II

| DATA WORD | STANDARD ERROR CORRECTING CODE | | | | | | | | | | | | | | | | IMPROVED ERROR CORRECTING CODE | | | | | | | | | | | | | | | |
|---|---|---|---|---|---|---|---|---|---|---|---|---|---|---|---|---|---|---|---|---|---|---|---|---|---|---|---|---|---|---|---|---|
| | $^1x$ | | | | | | | | $^2x$ | | | | | | | | $^1y$ | | | | | | | | $^2y$ | | | | | | | |
| x | 1 | 2 | 3 | 4 | 5 | 6 | 7 | 8 | A | B | C | D | E | F | G | H | 1 | 2 | 4 | 7 | A | B | $\overline{D}$ | $\overline{G}$ | 3 | 5 | 6 | 8 | C | E | $\overline{F}$ | $\overline{H}$ |
| 1 | 0 0 0 0 0 0 0 0 | | | | | | | | 0 | 0 | 0 | 0 | 0 | 0 | 0 | 0 | 0 | 0 | 0 | 0 | 0 | 0 | 1 | 1 | 0 | 0 | 0 | 0 | 0 | 0 | 1 | 1 |
| 1 | 1 0 0 0 0 0 0 0 | | | | | | | | 1 | 0 | 0 | 1 | 1 | 1 | 0 | 0 | 1 | 0 | 0 | 0 | 1 | 0 | 0 | 1 | 0 | 0 | 0 | 0 | 0 | 1 | 0 | 1 |
| 2 | 0 1 0 0 0 0 0 0 | | | | | | | | 0 | 1 | 0 | 0 | 1 | 1 | 1 | 0 | 0 | 1 | 0 | 0 | 0 | 1 | 1 | 0 | 0 | 0 | 0 | 0 | 0 | 1 | 0 | 1 |
| 3 | 1 1 0 0 0 0 0 0 | | | | | | | | 1 | 1 | 0 | 1 | 0 | 0 | 1 | 0 | 1 | 1 | 0 | 0 | 1 | 1 | 0 | 0 | 0 | 0 | 0 | 0 | 0 | 0 | 1 | 1 |
| 4 | 0 0 1 0 0 0 0 0 | | | | | | | | 0 | 0 | 1 | 0 | 0 | 1 | 1 | 1 | 0 | 0 | 0 | 0 | 0 | 0 | 1 | 0 | 1 | 0 | 0 | 0 | 1 | 0 | 0 | 0 |
| 5 | 1 0 1 0 0 0 0 0 | | | | | | | | 1 | 0 | 1 | 1 | 1 | 0 | 1 | 1 | 1 | 0 | 0 | 0 | 1 | 0 | 0 | 0 | 1 | 0 | 0 | 0 | 1 | 1 | 1 | 0 |
| 6 | 0 1 1 0 0 0 0 0 | | | | | | | | 0 | 1 | 1 | 0 | 1 | 0 | 0 | 1 | 0 | 1 | 0 | 0 | 0 | 1 | 1 | 1 | 1 | 0 | 0 | 0 | 1 | 1 | 1 | 0 |
| 7 | 1 1 1 0 0 0 0 0 | | | | | | | | 1 | 1 | 1 | 1 | 0 | 1 | 0 | 1 | 1 | 1 | 0 | 0 | 1 | 1 | 0 | 1 | 1 | 0 | 0 | 0 | 1 | 0 | 0 | 0 |
| 8 | 0 0 0 1 0 0 0 0 | | | | | | | | 1 | 0 | 0 | 0 | 1 | 1 | 1 | 1 | 0 | 0 | 1 | 0 | 1 | 0 | 1 | 0 | 0 | 0 | 0 | 0 | 0 | 1 | 0 | 0 |
| 9 | 1 0 0 1 0 0 0 0 | | | | | | | | 0 | 0 | 0 | 1 | 0 | 0 | 1 | 1 | 1 | 0 | 1 | 0 | 0 | 0 | 0 | 0 | 0 | 0 | 0 | 0 | 0 | 0 | 1 | 0 |
| 10 | 0 1 0 1 0 0 0 0 | | | | | | | | 1 | 1 | 0 | 0 | 0 | 0 | 0 | 1 | 0 | 1 | 1 | 0 | 1 | 1 | 1 | 1 | 0 | 0 | 0 | 0 | 0 | 0 | 1 | 0 |
| 11 | 1 1 0 1 0 0 0 0 | | | | | | | | 0 | 1 | 0 | 1 | 1 | 1 | 0 | 1 | 1 | 1 | 1 | 0 | 0 | 1 | 0 | 1 | 0 | 0 | 0 | 0 | 0 | 1 | 0 | 0 |
| 12 | 0 0 1 1 0 0 0 0 | | | | | | | | 1 | 0 | 1 | 0 | 1 | 0 | 0 | 0 | 0 | 0 | 1 | 0 | 1 | 0 | 1 | 1 | 1 | 0 | 0 | 0 | 1 | 1 | 1 | 1 |
| 13 | 1 0 1 1 0 0 0 0 | | | | | | | | 0 | 0 | 1 | 1 | 0 | 1 | 0 | 0 | 1 | 0 | 1 | 0 | 0 | 0 | 0 | 1 | 1 | 0 | 0 | 0 | 1 | 0 | 0 | 1 |
| 14 | 0 1 1 1 0 0 0 0 | | | | | | | | 1 | 1 | 1 | 0 | 0 | 1 | 1 | 0 | 0 | 1 | 1 | 0 | 1 | 1 | 1 | 0 | 1 | 0 | 0 | 0 | 1 | 0 | 0 | 1 |
| 15 | 1 1 1 1 0 0 0 0 | | | | | | | | 0 | 1 | 1 | 1 | 1 | 0 | 1 | 0 | 1 | 1 | 1 | 0 | 0 | 1 | 0 | 0 | 1 | 0 | 0 | 0 | 1 | 1 | 1 | 1 |
| 16 | 0 0 0 0 1 0 0 0 | | | | | | | | 1 | 1 | 0 | 1 | 1 | 0 | 1 | 1 | 0 | 0 | 0 | 0 | 1 | 1 | 0 | 0 | 0 | 1 | 0 | 0 | 0 | 1 | 1 | 0 |
| 17 | 1 0 0 0 1 0 0 0 | | | | | | | | 0 | 1 | 0 | 0 | 0 | 1 | 1 | 1 | 1 | 0 | 0 | 0 | 0 | 1 | 1 | 0 | 0 | 1 | 0 | 0 | 0 | 0 | 0 | 0 |
| 18 | 0 1 0 0 1 0 0 0 | | | | | | | | 1 | 0 | 0 | 1 | 0 | 1 | 0 | 1 | 0 | 1 | 0 | 0 | 1 | 0 | 0 | 1 | 0 | 1 | 0 | 0 | 0 | 0 | 0 | 0 |
| 19 | 1 1 0 0 1 0 0 0 | | | | | | | | 0 | 0 | 0 | 0 | 1 | 0 | 0 | 1 | 1 | 1 | 0 | 0 | 0 | 0 | 1 | 1 | 0 | 1 | 0 | 0 | 0 | 1 | 1 | 0 |
| 20 | 0 0 1 0 1 0 0 0 | | | | | | | | 1 | 1 | 1 | 1 | 1 | 1 | 0 | 0 | 0 | 0 | 0 | 0 | 1 | 1 | 0 | 1 | 1 | 1 | 0 | 0 | 1 | 1 | 0 | 1 |
| 21 | 1 0 1 0 1 0 0 0 | | | | | | | | 0 | 1 | 1 | 0 | 0 | 0 | 0 | 0 | 1 | 0 | 0 | 0 | 0 | 1 | 1 | 1 | 1 | 1 | 0 | 0 | 1 | 0 | 1 | 1 |
| 22 | 0 1 1 0 1 0 0 0 | | | | | | | | 1 | 0 | 1 | 1 | 0 | 0 | 1 | 0 | 0 | 1 | 0 | 0 | 1 | 0 | 0 | 0 | 1 | 1 | 0 | 0 | 1 | 0 | 1 | 1 |
| 23 | 1 1 1 0 1 0 0 0 | | | | | | | | 0 | 0 | 1 | 0 | 1 | 1 | 1 | 0 | 1 | 1 | 0 | 0 | 0 | 0 | 1 | 0 | 1 | 1 | 0 | 0 | 1 | 1 | 0 | 1 |
| 24 | 0 0 0 1 1 0 0 0 | | | | | | | | 0 | 1 | 0 | 1 | 0 | 1 | 0 | 0 | 0 | 0 | 1 | 0 | 0 | 1 | 0 | 1 | 0 | 1 | 0 | 0 | 0 | 0 | 0 | 1 |
| 25 | 1 0 0 1 1 0 0 0 | | | | | | | | 1 | 1 | 0 | 0 | 1 | 0 | 0 | 0 | 1 | 0 | 1 | 0 | 1 | 1 | 1 | 1 | 0 | 1 | 0 | 0 | 0 | 1 | 1 | 1 |
| 26 | 0 1 0 1 1 0 0 0 | | | | | | | | 0 | 0 | 0 | 1 | 1 | 0 | 1 | 0 | 0 | 1 | 1 | 0 | 0 | 0 | 0 | 0 | 0 | 1 | 0 | 0 | 0 | 1 | 1 | 1 |
| 27 | 1 1 0 1 1 0 0 0 | | | | | | | | 1 | 0 | 0 | 0 | 0 | 1 | 1 | 0 | 1 | 1 | 1 | 0 | 1 | 0 | 1 | 0 | 0 | 1 | 0 | 0 | 0 | 0 | 0 | 1 |
| 28 | 0 0 1 1 1 0 0 0 | | | | | | | | 0 | 1 | 1 | 1 | 0 | 0 | 1 | 1 | 0 | 0 | 1 | 0 | 0 | 1 | 0 | 0 | 1 | 1 | 0 | 1 | 0 | 1 | 1 | 0 |
| 29 | 1 0 1 1 1 0 0 0 | | | | | | | | 1 | 1 | 1 | 0 | 1 | 1 | 1 | 1 | 1 | 0 | 1 | 0 | 1 | 1 | 1 | 0 | 1 | 1 | 0 | 1 | 0 | 0 | 1 | 0 |
| 30 | 0 1 1 1 1 0 0 0 | | | | | | | | 0 | 0 | 1 | 1 | 1 | 1 | 0 | 1 | 0 | 1 | 1 | 0 | 0 | 0 | 0 | 1 | 1 | 1 | 0 | 1 | 0 | 1 | 1 | 0 |
| 31 | 1 1 1 1 1 0 0 0 | | | | | | | | 1 | 0 | 1 | 0 | 0 | 0 | 0 | 1 | 1 | 1 | 1 | 0 | 1 | 0 | 1 | 1 | 1 | 1 | 0 | 1 | 0 | 1 | 1 | 0 |
| 32 | 0 0 0 0 0 1 0 0 | | | | | | | | 1 | 1 | 1 | 1 | 0 | 0 | 0 | 1 | 0 | 0 | 0 | 0 | 1 | 1 | 0 | 1 | 0 | 0 | 1 | 0 | 1 | 0 | 1 | 0 |
| 33 | 1 0 0 0 0 1 0 0 | | | | | | | | 0 | 1 | 1 | 0 | 1 | 1 | 0 | 1 | 1 | 0 | 0 | 0 | 0 | 1 | 1 | 1 | 0 | 0 | 1 | 0 | 1 | 1 | 0 | 0 |
| 34 | 0 1 0 0 0 1 0 0 | | | | | | | | 1 | 0 | 1 | 1 | 1 | 1 | 1 | 1 | 0 | 1 | 0 | 0 | 1 | 0 | 0 | 0 | 0 | 0 | 1 | 0 | 1 | 1 | 0 | 1 |
| 35 | 1 1 0 0 0 1 0 0 | | | | | | | | 0 | 0 | 1 | 0 | 0 | 0 | 1 | 1 | 1 | 1 | 0 | 0 | 0 | 0 | 1 | 0 | 0 | 0 | 1 | 0 | 1 | 0 | 1 | 0 |
| 36 | 0 0 1 0 0 1 0 0 | | | | | | | | 1 | 1 | 0 | 1 | 0 | 1 | 1 | 0 | 0 | 0 | 0 | 0 | 1 | 1 | 0 | 0 | 1 | 0 | 1 | 0 | 0 | 0 | 0 | 1 |
| 37 | 1 0 1 0 0 1 0 0 | | | | | | | | 0 | 1 | 0 | 0 | 1 | 0 | 1 | 0 | 1 | 0 | 0 | 0 | 0 | 1 | 1 | 0 | 1 | 0 | 1 | 0 | 0 | 1 | 1 | 1 |
| 38 | 0 1 1 0 0 1 0 0 | | | | | | | | 1 | 0 | 0 | 1 | 0 | 0 | 0 | 1 | 0 | 1 | 0 | 0 | 1 | 0 | 0 | 1 | 1 | 0 | 1 | 0 | 0 | 1 | 1 | 1 |
| 39 | 1 1 1 0 0 1 0 0 | | | | | | | | 0 | 0 | 0 | 0 | 0 | 1 | 0 | 0 | 1 | 1 | 0 | 0 | 0 | 0 | 1 | 1 | 1 | 0 | 1 | 0 | 0 | 0 | 0 | 1 |
| 40 | 0 0 0 1 0 1 0 0 | | | | | | | | 0 | 1 | 1 | 1 | 1 | 1 | 1 | 0 | 0 | 0 | 1 | 0 | 0 | 1 | 0 | 0 | 0 | 0 | 1 | 0 | 1 | 1 | 0 | 1 |
| 41 | 1 0 0 1 0 1 0 0 | | | | | | | | 1 | 1 | 1 | 0 | 0 | 0 | 1 | 0 | 1 | 0 | 1 | 0 | 1 | 1 | 1 | 0 | 0 | 0 | 1 | 0 | 1 | 0 | 1 | 1 |
| 42 | 0 1 0 1 0 1 0 0 | | | | | | | | 0 | 0 | 1 | 1 | 0 | 0 | 0 | 0 | 0 | 1 | 1 | 0 | 0 | 0 | 0 | 1 | 0 | 0 | 1 | 0 | 1 | 0 | 1 | 1 |
| 43 | 1 1 0 1 0 1 0 0 | | | | | | | | 1 | 0 | 1 | 0 | 1 | 1 | 0 | 0 | 1 | 1 | 1 | 0 | 1 | 0 | 1 | 1 | 0 | 0 | 1 | 0 | 1 | 1 | 0 | 1 |
| 44 | 0 0 1 1 0 1 0 0 | | | | | | | | 0 | 1 | 0 | 1 | 1 | 0 | 0 | 1 | 0 | 0 | 1 | 0 | 0 | 1 | 0 | 1 | 1 | 0 | 1 | 0 | 0 | 1 | 1 | 0 |
| 45 | 1 0 1 1 0 1 0 0 | | | | | | | | 1 | 1 | 0 | 0 | 0 | 1 | 0 | 1 | 1 | 0 | 1 | 0 | 1 | 1 | 1 | 1 | 1 | 0 | 1 | 0 | 0 | 0 | 0 | 0 |
| 46 | 0 1 1 1 0 1 0 0 | | | | | | | | 0 | 0 | 0 | 1 | 0 | 1 | 1 | 1 | 0 | 1 | 0 | 0 | 0 | 0 | 0 | 1 | 1 | 0 | 1 | 0 | 0 | 0 | 0 | 0 |
| 47 | 1 1 1 1 0 1 0 0 | | | | | | | | 1 | 0 | 0 | 0 | 1 | 0 | 1 | 1 | 1 | 1 | 1 | 0 | 1 | 0 | 1 | 0 | 1 | 0 | 1 | 0 | 0 | 1 | 1 | 0 |
| 48 | 0 0 0 0 1 1 0 0 | | | | | | | | 0 | 0 | 1 | 0 | 1 | 0 | 1 | 0 | 0 | 0 | 0 | 0 | 0 | 1 | 0 | 0 | 0 | 1 | 1 | 0 | 1 | 1 | 1 | 1 |
| 49 | 1 0 0 0 1 1 0 0 | | | | | | | | 1 | 0 | 1 | 1 | 1 | 0 | 1 | 1 | 1 | 0 | 0 | 0 | 1 | 0 | 0 | 0 | 0 | 1 | 1 | 0 | 1 | 0 | 0 | 1 |
| 50 | 0 1 0 0 1 1 0 0 | | | | | | | | 0 | 1 | 1 | 0 | 0 | 1 | 0 | 0 | 0 | 1 | 0 | 0 | 1 | 1 | 1 | 1 | 0 | 1 | 1 | 0 | 1 | 0 | 0 | 1 |
| 51 | 1 1 0 0 1 1 0 0 | | | | | | | | 1 | 1 | 1 | 1 | 1 | 0 | 0 | 0 | 1 | 1 | 0 | 0 | 1 | 1 | 0 | 1 | 0 | 1 | 1 | 0 | 1 | 1 | 1 | 1 |
| 52 | 0 0 1 0 1 1 0 0 | | | | | | | | 0 | 0 | 0 | 0 | 1 | 1 | 0 | 1 | 0 | 0 | 0 | 0 | 0 | 0 | 1 | 1 | 1 | 1 | 1 | 0 | 0 | 1 | 0 | 0 |
| 53 | 1 0 1 0 1 1 0 0 | | | | | | | | 1 | 0 | 0 | 1 | 0 | 0 | 0 | 1 | 1 | 0 | 0 | 0 | 1 | 0 | 0 | 1 | 1 | 1 | 1 | 0 | 0 | 0 | 1 | 0 |
| 54 | 0 1 1 0 1 1 0 0 | | | | | | | | 0 | 1 | 0 | 0 | 0 | 1 | 1 | 1 | 0 | 1 | 0 | 0 | 0 | 1 | 1 | 0 | 1 | 1 | 1 | 0 | 0 | 0 | 1 | 0 |
| 55 | 1 1 1 0 1 1 0 0 | | | | | | | | 1 | 1 | 0 | 1 | 1 | 1 | 1 | 1 | 1 | 1 | 0 | 0 | 1 | 0 | 0 | 0 | 1 | 1 | 1 | 0 | 0 | 1 | 0 | 0 |
| 56 | 0 0 0 1 1 1 0 0 | | | | | | | | 1 | 0 | 1 | 0 | 0 | 1 | 0 | 1 | 0 | 0 | 1 | 0 | 1 | 0 | 1 | 1 | 0 | 1 | 1 | 1 | 1 | 0 | 0 | 0 |
| 57 | 1 0 0 1 1 1 0 0 | | | | | | | | 0 | 0 | 1 | 1 | 1 | 0 | 0 | 1 | 1 | 0 | 1 | 0 | 0 | 0 | 0 | 1 | 0 | 1 | 1 | 1 | 1 | 1 | 1 | 0 |
| 58 | 0 1 0 1 1 1 0 0 | | | | | | | | 1 | 1 | 1 | 0 | 1 | 0 | 1 | 1 | 0 | 1 | 1 | 0 | 1 | 1 | 1 | 0 | 0 | 1 | 1 | 1 | 1 | 1 | 1 | 0 |
| 59 | 1 1 0 1 1 1 0 0 | | | | | | | | 0 | 1 | 1 | 1 | 0 | 1 | 1 | 1 | 1 | 1 | 1 | 0 | 0 | 1 | 0 | 0 | 0 | 1 | 1 | 1 | 1 | 0 | 0 | 0 |
| 60 | 0 0 1 1 1 1 0 0 | | | | | | | | 1 | 0 | 0 | 0 | 0 | 0 | 0 | 0 | 0 | 0 | 1 | 0 | 1 | 0 | 1 | 0 | 1 | 1 | 1 | 0 | 0 | 0 | 1 | 1 |
| 61 | 1 0 1 1 1 1 0 0 | | | | | | | | 0 | 0 | 0 | 1 | 1 | 1 | 0 | 0 | 1 | 0 | 1 | 0 | 0 | 0 | 0 | 0 | 1 | 1 | 1 | 0 | 0 | 1 | 0 | 1 |
| 62 | 0 1 1 1 1 1 0 0 | | | | | | | | 1 | 1 | 0 | 0 | 1 | 1 | 0 | 0 | 0 | 1 | 1 | 0 | 1 | 1 | 1 | 1 | 1 | 1 | 1 | 0 | 0 | 1 | 0 | 1 |
| 63 | 1 1 1 1 1 1 0 0 | | | | | | | | 0 | 1 | 0 | 1 | 0 | 0 | 0 | 0 | 1 | 1 | 1 | 0 | 0 | 1 | 0 | 1 | 1 | 1 | 1 | 0 | 0 | 0 | 1 | 1 |
| 64 | 0 0 0 0 0 0 1 0 | | | | | | | | 1 | 1 | 1 | 0 | 0 | 1 | 0 | 0 | 0 | 0 | 0 | 1 | 1 | 1 | 1 | 1 | 0 | 0 | 0 | 0 | 1 | 0 | 0 | 1 |

TABLE II-continued

| DATA WORD | STANDARD ERROR CORRECTING CODE | | | | | | | | | | | | | | | | IMPROVED ERROR CORRECTING CODE | | | | | | | | | | | | | |
|---|---|---|---|---|---|---|---|---|---|---|---|---|---|---|---|---|---|---|---|---|---|---|---|---|---|---|---|---|---|---|
| | 1x | | | | | | | | 2x | | | | | | | | 1y | | | | | | | | 2y | | | | | | |
| x | 1 | 2 | 3 | 4 | 5 | 6 | 7 | 8 | A | B | C | D | E | F | G | H | 1 | 2 | 4 | 7 | A | B | $\bar{D}$ | $\bar{\bar{G}}$ | 3 | 5 | 6 | 8 | C | E | $\bar{F}$ | $\bar{\bar{H}}$ |
| 65 | 1 | 0 | 0 | 0 | 0 | 0 | 1 | 0 | 0 | 1 | 1 | 1 | 1 | 0 | 0 | 0 | 1 | 0 | 0 | 1 | 0 | 1 | 0 | 1 | 0 | 0 | 0 | 0 | 1 | 1 | 1 | 1 |
| 66 | 0 | 1 | 0 | 0 | 0 | 0 | 1 | 0 | 1 | 0 | 1 | 0 | 1 | 0 | 1 | 0 | 0 | 1 | 0 | 1 | 1 | 0 | 1 | 0 | 0 | 0 | 0 | 0 | 1 | 1 | 1 | 1 |
| 67 | 1 | 1 | 0 | 0 | 0 | 0 | 1 | 0 | 0 | 0 | 1 | 1 | 0 | 1 | 1 | 0 | 1 | 1 | 0 | 1 | 0 | 0 | 0 | 0 | 0 | 0 | 0 | 1 | 0 | 0 | 0 | 1 |
| 68 | 0 | 0 | 1 | 0 | 0 | 0 | 1 | 0 | 1 | 1 | 0 | 0 | 0 | 0 | 1 | 1 | 0 | 0 | 0 | 1 | 1 | 1 | 1 | 0 | 1 | 0 | 0 | 0 | 0 | 0 | 1 | 0 |
| 69 | 1 | 0 | 1 | 0 | 0 | 0 | 1 | 0 | 0 | 1 | 0 | 1 | 1 | 1 | 1 | 1 | 1 | 0 | 0 | 1 | 0 | 1 | 0 | 0 | 1 | 0 | 0 | 0 | 0 | 1 | 0 | 0 |
| 70 | 0 | 1 | 1 | 0 | 0 | 0 | 1 | 0 | 1 | 0 | 0 | 0 | 1 | 1 | 0 | 1 | 0 | 1 | 0 | 1 | 1 | 0 | 1 | 1 | 1 | 0 | 0 | 0 | 0 | 1 | 0 | 0 |
| 71 | 1 | 1 | 1 | 0 | 0 | 0 | 1 | 0 | 0 | 0 | 0 | 1 | 0 | 0 | 0 | 1 | 1 | 1 | 0 | 1 | 0 | 0 | 0 | 1 | 1 | 0 | 0 | 0 | 0 | 0 | 1 | 0 |
| 72 | 0 | 0 | 0 | 1 | 0 | 0 | 1 | 0 | 0 | 1 | 1 | 0 | 1 | 0 | 1 | 1 | 0 | 0 | 1 | 1 | 0 | 1 | 1 | 0 | 0 | 0 | 0 | 0 | 1 | 1 | 1 | 0 |
| 73 | 1 | 0 | 0 | 1 | 0 | 0 | 1 | 0 | 1 | 1 | 1 | 1 | 0 | 1 | 1 | 1 | 1 | 0 | 1 | 1 | 1 | 1 | 0 | 0 | 0 | 0 | 0 | 0 | 1 | 0 | 0 | 0 |
| 74 | 0 | 1 | 0 | 1 | 0 | 0 | 1 | 0 | 0 | 0 | 1 | 0 | 0 | 1 | 0 | 1 | 0 | 1 | 1 | 1 | 0 | 0 | 1 | 1 | 0 | 0 | 0 | 0 | 1 | 0 | 0 | 0 |
| 75 | 1 | 1 | 0 | 1 | 0 | 0 | 1 | 0 | 1 | 0 | 1 | 1 | 1 | 0 | 0 | 1 | 1 | 1 | 1 | 1 | 1 | 0 | 0 | 1 | 0 | 0 | 0 | 0 | 1 | 1 | 1 | 0 |
| 76 | 0 | 0 | 1 | 1 | 0 | 0 | 1 | 0 | 0 | 1 | 0 | 0 | 1 | 1 | 0 | 0 | 0 | 0 | 1 | 1 | 0 | 1 | 1 | 1 | 1 | 0 | 0 | 0 | 0 | 1 | 0 | 1 |
| 77 | 1 | 0 | 1 | 1 | 0 | 0 | 1 | 0 | 1 | 1 | 0 | 1 | 0 | 0 | 0 | 0 | 1 | 0 | 1 | 1 | 1 | 1 | 0 | 1 | 1 | 0 | 0 | 0 | 0 | 0 | 1 | 1 |
| 78 | 0 | 1 | 1 | 1 | 0 | 0 | 1 | 0 | 0 | 0 | 0 | 0 | 0 | 0 | 1 | 0 | 0 | 1 | 1 | 1 | 0 | 0 | 1 | 0 | 1 | 0 | 0 | 0 | 0 | 0 | 1 | 1 |
| 79 | 1 | 1 | 1 | 1 | 0 | 0 | 1 | 0 | 1 | 0 | 0 | 1 | 1 | 1 | 1 | 0 | 1 | 1 | 1 | 1 | 0 | 0 | 0 | 1 | 1 | 0 | 0 | 0 | 0 | 1 | 0 | 1 |
| 80 | 0 | 0 | 0 | 0 | 1 | 0 | 1 | 0 | 0 | 0 | 1 | 1 | 1 | 1 | 1 | 1 | 0 | 0 | 0 | 1 | 0 | 0 | 0 | 0 | 0 | 1 | 0 | 0 | 1 | 1 | 0 | 0 |
| 81 | 1 | 0 | 0 | 0 | 1 | 0 | 1 | 0 | 1 | 0 | 1 | 0 | 0 | 0 | 1 | 1 | 1 | 0 | 0 | 1 | 1 | 0 | 1 | 0 | 0 | 1 | 0 | 0 | 1 | 0 | 1 | 0 |
| 82 | 0 | 1 | 0 | 0 | 1 | 0 | 1 | 0 | 0 | 1 | 1 | 1 | 0 | 0 | 0 | 1 | 0 | 1 | 0 | 1 | 0 | 1 | 0 | 1 | 0 | 1 | 0 | 0 | 1 | 0 | 1 | 0 |
| 83 | 1 | 1 | 0 | 0 | 1 | 0 | 1 | 0 | 1 | 1 | 1 | 0 | 1 | 1 | 0 | 1 | 1 | 1 | 0 | 1 | 1 | 1 | 1 | 1 | 0 | 1 | 0 | 0 | 1 | 1 | 0 | 0 |
| 84 | 0 | 0 | 1 | 0 | 1 | 0 | 1 | 0 | 0 | 0 | 0 | 1 | 1 | 0 | 0 | 0 | 0 | 0 | 0 | 1 | 0 | 0 | 0 | 1 | 1 | 1 | 0 | 0 | 0 | 1 | 1 | 1 |
| 85 | 1 | 0 | 1 | 0 | 1 | 0 | 1 | 0 | 1 | 0 | 0 | 0 | 0 | 1 | 0 | 0 | 1 | 0 | 0 | 1 | 1 | 0 | 1 | 1 | 1 | 1 | 0 | 0 | 0 | 0 | 0 | 1 |
| 86 | 0 | 1 | 1 | 0 | 1 | 0 | 1 | 0 | 0 | 1 | 0 | 1 | 0 | 1 | 1 | 0 | 0 | 1 | 0 | 1 | 0 | 1 | 0 | 0 | 1 | 1 | 0 | 0 | 0 | 0 | 0 | 1 |
| 87 | 1 | 1 | 1 | 0 | 1 | 0 | 1 | 0 | 1 | 1 | 0 | 0 | 1 | 0 | 1 | 0 | 1 | 1 | 1 | 1 | 1 | 1 | 1 | 0 | 1 | 1 | 0 | 0 | 0 | 1 | 1 | 1 |
| 88 | 0 | 0 | 0 | 1 | 1 | 0 | 1 | 0 | 1 | 0 | 1 | 1 | 0 | 0 | 0 | 0 | 0 | 0 | 1 | 1 | 1 | 0 | 0 | 1 | 0 | 1 | 0 | 0 | 1 | 0 | 1 | 1 |
| 89 | 1 | 0 | 0 | 1 | 1 | 0 | 1 | 0 | 0 | 0 | 1 | 0 | 1 | 1 | 0 | 0 | 1 | 0 | 1 | 1 | 0 | 0 | 1 | 1 | 0 | 1 | 0 | 0 | 1 | 1 | 0 | 1 |
| 90 | 0 | 1 | 0 | 1 | 1 | 0 | 1 | 0 | 1 | 1 | 1 | 1 | 1 | 1 | 1 | 0 | 0 | 1 | 1 | 1 | 1 | 1 | 0 | 0 | 0 | 1 | 0 | 0 | 1 | 1 | 0 | 1 |
| 91 | 1 | 1 | 0 | 1 | 1 | 0 | 1 | 0 | 0 | 1 | 1 | 0 | 0 | 0 | 0 | 1 | 1 | 1 | 1 | 1 | 0 | 1 | 1 | 0 | 0 | 1 | 0 | 0 | 1 | 0 | 1 | 1 |
| 92 | 0 | 0 | 1 | 1 | 1 | 0 | 1 | 0 | 1 | 0 | 0 | 1 | 0 | 1 | 1 | 1 | 0 | 0 | 1 | 1 | 1 | 0 | 0 | 0 | 1 | 1 | 0 | 0 | 0 | 0 | 0 | 0 |
| 93 | 1 | 0 | 1 | 1 | 1 | 0 | 1 | 0 | 0 | 0 | 0 | 0 | 1 | 0 | 1 | 1 | 1 | 0 | 1 | 1 | 0 | 0 | 1 | 0 | 1 | 1 | 0 | 0 | 0 | 1 | 1 | 0 |
| 94 | 0 | 1 | 1 | 1 | 1 | 0 | 1 | 0 | 1 | 1 | 0 | 1 | 1 | 0 | 0 | 1 | 0 | 1 | 1 | 1 | 1 | 1 | 0 | 1 | 1 | 1 | 0 | 0 | 0 | 1 | 1 | 0 |
| 95 | 1 | 1 | 1 | 1 | 1 | 0 | 1 | 0 | 0 | 1 | 0 | 0 | 0 | 1 | 0 | 1 | 1 | 1 | 1 | 1 | 0 | 1 | 1 | 1 | 1 | 1 | 0 | 0 | 0 | 0 | 0 | 0 |
| 96 | 0 | 0 | 0 | 0 | 0 | 1 | 1 | 0 | 0 | 0 | 1 | 0 | 1 | 0 | 1 | 1 | 0 | 0 | 0 | 1 | 0 | 0 | 0 | 0 | 1 | 0 | 1 | 0 | 0 | 0 | 0 | 0 |
| 97 | 1 | 0 | 0 | 0 | 0 | 1 | 1 | 0 | 1 | 0 | 0 | 0 | 1 | 0 | 0 | 1 | 1 | 0 | 0 | 1 | 1 | 0 | 1 | 1 | 0 | 0 | 1 | 0 | 0 | 1 | 1 | 0 |
| 98 | 0 | 1 | 0 | 0 | 0 | 1 | 1 | 0 | 0 | 1 | 0 | 1 | 1 | 0 | 1 | 1 | 0 | 1 | 0 | 1 | 0 | 1 | 0 | 0 | 0 | 0 | 1 | 0 | 0 | 1 | 1 | 0 |
| 99 | 1 | 1 | 0 | 0 | 0 | 1 | 1 | 0 | 1 | 1 | 0 | 0 | 0 | 1 | 1 | 1 | 1 | 1 | 0 | 1 | 1 | 1 | 1 | 1 | 0 | 0 | 1 | 0 | 0 | 0 | 0 | 0 |
| 100 | 0 | 0 | 1 | 0 | 0 | 1 | 1 | 0 | 0 | 0 | 1 | 1 | 0 | 0 | 1 | 0 | 0 | 0 | 0 | 1 | 0 | 0 | 0 | 0 | 1 | 0 | 1 | 0 | 1 | 0 | 1 | 1 |
| 101 | 1 | 0 | 1 | 0 | 0 | 1 | 1 | 0 | 1 | 0 | 1 | 0 | 1 | 1 | 1 | 0 | 1 | 0 | 0 | 1 | 1 | 0 | 1 | 0 | 1 | 0 | 1 | 0 | 1 | 1 | 0 | 1 |
| 102 | 0 | 1 | 1 | 0 | 0 | 1 | 1 | 0 | 0 | 1 | 1 | 1 | 1 | 1 | 0 | 0 | 0 | 1 | 0 | 1 | 0 | 1 | 0 | 1 | 1 | 0 | 1 | 0 | 1 | 1 | 0 | 1 |
| 103 | 1 | 1 | 1 | 0 | 0 | 1 | 1 | 0 | 1 | 1 | 1 | 0 | 0 | 0 | 0 | 0 | 1 | 1 | 0 | 1 | 1 | 1 | 1 | 1 | 1 | 0 | 1 | 0 | 1 | 0 | 1 | 1 |
| 104 | 0 | 0 | 0 | 1 | 0 | 1 | 1 | 0 | 1 | 0 | 0 | 1 | 1 | 0 | 1 | 0 | 0 | 0 | 1 | 1 | 1 | 0 | 0 | 0 | 0 | 0 | 1 | 0 | 0 | 1 | 1 | 1 |
| 105 | 1 | 0 | 0 | 1 | 0 | 1 | 1 | 0 | 0 | 0 | 0 | 0 | 0 | 1 | 1 | 0 | 1 | 0 | 1 | 1 | 0 | 0 | 1 | 0 | 0 | 0 | 1 | 0 | 0 | 0 | 0 | 1 |
| 106 | 0 | 1 | 0 | 1 | 0 | 1 | 1 | 0 | 1 | 1 | 0 | 1 | 0 | 1 | 0 | 0 | 0 | 1 | 1 | 1 | 1 | 1 | 0 | 1 | 0 | 0 | 1 | 0 | 0 | 0 | 0 | 1 |
| 107 | 1 | 1 | 0 | 1 | 0 | 1 | 1 | 0 | 0 | 1 | 0 | 0 | 1 | 0 | 0 | 0 | 1 | 1 | 1 | 1 | 0 | 1 | 1 | 1 | 0 | 0 | 1 | 0 | 0 | 1 | 1 | 1 |
| 108 | 0 | 0 | 1 | 1 | 0 | 1 | 1 | 0 | 1 | 0 | 1 | 1 | 1 | 1 | 0 | 1 | 0 | 0 | 1 | 1 | 1 | 0 | 0 | 1 | 1 | 0 | 1 | 0 | 1 | 1 | 0 | 0 |
| 109 | 1 | 0 | 1 | 1 | 0 | 1 | 1 | 0 | 0 | 0 | 1 | 0 | 0 | 0 | 0 | 1 | 1 | 0 | 1 | 1 | 0 | 0 | 1 | 1 | 1 | 0 | 1 | 0 | 1 | 0 | 1 | 0 |
| 110 | 0 | 1 | 1 | 1 | 0 | 1 | 1 | 0 | 1 | 1 | 1 | 1 | 0 | 0 | 1 | 1 | 0 | 1 | 1 | 1 | 1 | 1 | 0 | 0 | 1 | 0 | 1 | 0 | 1 | 0 | 1 | 0 |
| 111 | 1 | 1 | 1 | 1 | 0 | 1 | 1 | 0 | 0 | 1 | 1 | 0 | 1 | 1 | 1 | 1 | 1 | 1 | 1 | 1 | 0 | 1 | 1 | 0 | 1 | 0 | 1 | 0 | 1 | 1 | 0 | 0 |
| 112 | 0 | 0 | 0 | 0 | 1 | 1 | 1 | 0 | 1 | 1 | 0 | 0 | 1 | 1 | 1 | 0 | 0 | 0 | 0 | 1 | 1 | 1 | 1 | 0 | 0 | 1 | 1 | 0 | 0 | 1 | 0 | 1 |
| 113 | 1 | 0 | 0 | 0 | 1 | 1 | 1 | 0 | 0 | 1 | 0 | 1 | 0 | 0 | 1 | 0 | 2 | 0 | 0 | 1 | 0 | 1 | 0 | 0 | 0 | 1 | 1 | 0 | 0 | 0 | 1 | 1 |
| 114 | 0 | 1 | 0 | 0 | 1 | 1 | 1 | 0 | 1 | 0 | 0 | 0 | 0 | 0 | 0 | 0 | 0 | 1 | 0 | 1 | 1 | 0 | 1 | 1 | 0 | 1 | 1 | 0 | 0 | 0 | 1 | 1 |
| 115 | 1 | 1 | 0 | 0 | 1 | 1 | 1 | 0 | 0 | 0 | 0 | 1 | 1 | 1 | 0 | 0 | 1 | 1 | 0 | 1 | 0 | 0 | 0 | 1 | 0 | 1 | 1 | 0 | 0 | 1 | 0 | 1 |
| 116 | 0 | 0 | 1 | 0 | 1 | 1 | 1 | 0 | 1 | 1 | 1 | 0 | 1 | 0 | 0 | 1 | 0 | 0 | 0 | 1 | 1 | 1 | 1 | 1 | 1 | 1 | 1 | 0 | 1 | 0 | 1 | 0 |
| 117 | 1 | 0 | 1 | 0 | 1 | 1 | 1 | 0 | 0 | 1 | 1 | 1 | 0 | 1 | 0 | 1 | 1 | 0 | 0 | 1 | 0 | 1 | 0 | 1 | 1 | 1 | 1 | 0 | 1 | 0 | 0 | 0 |
| 118 | 0 | 1 | 1 | 0 | 1 | 1 | 1 | 0 | 1 | 0 | 1 | 0 | 0 | 1 | 1 | 1 | 0 | 1 | 0 | 1 | 0 | 1 | 0 | 1 | 1 | 1 | 1 | 0 | 1 | 0 | 0 | 0 |
| 119 | 1 | 1 | 1 | 0 | 1 | 1 | 1 | 0 | 0 | 0 | 1 | 1 | 1 | 0 | 1 | 1 | 1 | 1 | 0 | 1 | 0 | 0 | 0 | 0 | 1 | 1 | 1 | 0 | 1 | 1 | 1 | 0 |
| 120 | 0 | 0 | 0 | 1 | 1 | 1 | 1 | 0 | 1 | 1 | 0 | 0 | 0 | 0 | 0 | 1 | 0 | 0 | 1 | 1 | 0 | 1 | 1 | 1 | 0 | 1 | 1 | 0 | 0 | 0 | 1 | 0 |
| 121 | 1 | 0 | 0 | 1 | 1 | 1 | 1 | 0 | 1 | 1 | 0 | 1 | 1 | 1 | 0 | 1 | 1 | 0 | 1 | 1 | 1 | 1 | 0 | 1 | 0 | 1 | 1 | 0 | 0 | 1 | 0 | 0 |
| 122 | 0 | 1 | 0 | 1 | 1 | 1 | 1 | 0 | 0 | 0 | 0 | 0 | 1 | 1 | 1 | 1 | 0 | 1 | 1 | 1 | 0 | 0 | 1 | 0 | 0 | 1 | 1 | 0 | 1 | 0 | 1 | 0 |
| 123 | 1 | 1 | 0 | 1 | 1 | 1 | 1 | 0 | 1 | 0 | 0 | 1 | 0 | 0 | 1 | 1 | 1 | 1 | 1 | 1 | 1 | 0 | 0 | 0 | 0 | 1 | 1 | 0 | 1 | 0 | 0 | 0 |
| 124 | 0 | 0 | 1 | 1 | 1 | 1 | 1 | 0 | 0 | 1 | 1 | 0 | 0 | 1 | 1 | 0 | 0 | 0 | 1 | 1 | 0 | 1 | 0 | 1 | 1 | 1 | 1 | 0 | 1 | 0 | 0 | 1 |
| 125 | 1 | 0 | 1 | 1 | 1 | 1 | 1 | 0 | 1 | 1 | 1 | 1 | 1 | 0 | 1 | 0 | 1 | 0 | 1 | 1 | 1 | 1 | 0 | 0 | 1 | 1 | 1 | 0 | 1 | 1 | 1 | 1 |
| 126 | 0 | 1 | 1 | 1 | 1 | 1 | 1 | 0 | 0 | 0 | 1 | 0 | 1 | 0 | 0 | 0 | 0 | 1 | 1 | 1 | 0 | 0 | 1 | 1 | 1 | 1 | 1 | 0 | 1 | 1 | 1 | 1 |
| 127 | 1 | 1 | 1 | 1 | 1 | 1 | 1 | 0 | 1 | 0 | 1 | 1 | 0 | 1 | 0 | 0 | 1 | 1 | 1 | 1 | 0 | 0 | 1 | 1 | 1 | 1 | 1 | 0 | 1 | 0 | 0 | 1 |
| 128 | 0 | 0 | 0 | 0 | 0 | 0 | 0 | 1 | 0 | 1 | 1 | 1 | 0 | 0 | 1 | 0 | 0 | 0 | 0 | 0 | 0 | 1 | 0 | 0 | 0 | 0 | 0 | 1 | 1 | 0 | 1 | 0 |
| 129 | 1 | 0 | 0 | 0 | 0 | 0 | 0 | 1 | 1 | 1 | 1 | 0 | 1 | 1 | 1 | 0 | 1 | 0 | 0 | 0 | 1 | 1 | 1 | 0 | 0 | 0 | 0 | 1 | 1 | 1 | 0 | 0 |
| 130 | 0 | 1 | 0 | 0 | 0 | 0 | 0 | 1 | 0 | 0 | 1 | 1 | 1 | 1 | 0 | 0 | 0 | 1 | 0 | 0 | 0 | 0 | 0 | 1 | 0 | 0 | 1 | 1 | 1 | 0 | 1 | 0 |
| 131 | 1 | 1 | 0 | 0 | 0 | 0 | 0 | 1 | 1 | 0 | 1 | 0 | 0 | 0 | 0 | 0 | 1 | 1 | 0 | 0 | 1 | 0 | 1 | 1 | 0 | 0 | 1 | 1 | 0 | 1 | 1 | 0 |
| 132 | 0 | 0 | 1 | 0 | 0 | 0 | 0 | 1 | 0 | 1 | 0 | 1 | 0 | 1 | 0 | 1 | 0 | 0 | 0 | 0 | 1 | 0 | 1 | 1 | 1 | 0 | 0 | 1 | 1 | 0 | 0 | 0 |
| 133 | 1 | 0 | 1 | 0 | 0 | 0 | 0 | 1 | 1 | 1 | 0 | 0 | 1 | 0 | 0 | 1 | 1 | 0 | 0 | 0 | 1 | 1 | 1 | 1 | 1 | 0 | 0 | 1 | 0 | 1 | 1 | 0 |
| 134 | 0 | 1 | 1 | 0 | 0 | 0 | 0 | 1 | 0 | 0 | 0 | 1 | 1 | 0 | 1 | 1 | 0 | 1 | 0 | 0 | 0 | 0 | 0 | 0 | 1 | 0 | 0 | 1 | 0 | 1 | 1 | 0 |
| 135 | 1 | 1 | 1 | 0 | 0 | 0 | 0 | 1 | 1 | 0 | 0 | 0 | 0 | 1 | 1 | 1 | 1 | 1 | 0 | 0 | 1 | 0 | 1 | 0 | 1 | 0 | 0 | 1 | 0 | 0 | 0 | 0 |
| 136 | 0 | 0 | 0 | 1 | 0 | 0 | 0 | 1 | 1 | 1 | 1 | 1 | 1 | 1 | 0 | 0 | 0 | 0 | 1 | 0 | 1 | 1 | 1 | 0 | 1 | 0 | 0 | 1 | 1 | 1 | 0 | 0 |
| 137 | 1 | 0 | 0 | 1 | 0 | 0 | 0 | 1 | 0 | 1 | 1 | 0 | 0 | 0 | 0 | 1 | 1 | 0 | 1 | 0 | 0 | 1 | 1 | 0 | 0 | 0 | 0 | 1 | 1 | 0 | 1 | 0 |
| 138 | 0 | 1 | 0 | 1 | 0 | 0 | 0 | 1 | 1 | 0 | 1 | 1 | 0 | 0 | 1 | 1 | 0 | 1 | 1 | 0 | 1 | 0 | 0 | 1 | 0 | 0 | 0 | 1 | 1 | 0 | 1 | 0 |
| 139 | 1 | 1 | 0 | 1 | 0 | 0 | 0 | 1 | 0 | 0 | 1 | 0 | 1 | 1 | 1 | 1 | 1 | 1 | 1 | 0 | 0 | 0 | 0 | 1 | 0 | 0 | 0 | 1 | 1 | 1 | 0 | 0 |
| 140 | 0 | 0 | 1 | 1 | 0 | 0 | 0 | 1 | 1 | 1 | 0 | 1 | 0 | 1 | 1 | 0 | 0 | 0 | 1 | 0 | 1 | 1 | 0 | 0 | 1 | 0 | 0 | 1 | 0 | 1 | 1 | 0 |
| 141 | 1 | 0 | 1 | 1 | 0 | 0 | 0 | 1 | 0 | 1 | 0 | 0 | 0 | 1 | 1 | 0 | 1 | 0 | 1 | 0 | 0 | 1 | 0 | 1 | 1 | 0 | 0 | 1 | 0 | 0 | 0 | 1 |
| 142 | 0 | 1 | 1 | 1 | 0 | 0 | 0 | 1 | 1 | 0 | 0 | 1 | 0 | 1 | 0 | 0 | 0 | 1 | 1 | 0 | 1 | 0 | 0 | 1 | 1 | 0 | 0 | 1 | 0 | 0 | 0 | 1 |

TABLE II-continued

| DATA WORD | STANDARD ERROR CORRECTING CODE | | | | | | | | | | | | | | IMPROVED ERROR CORRECTING CODE | | | | | | | | | | | | |
|---|---|---|---|---|---|---|---|---|---|---|---|---|---|---|---|---|---|---|---|---|---|---|---|---|---|---|---|
| | 1x | | | | | | | | 2x | | | | | | | | 1y | | | | | | | 2y | | | |
| x | 1 | 2 | 3 | 4 | 5 | 6 | 7 | 8 | A | B | C | D | E | F | G | H | 1 | 2 | 4 | 7 | A | B | $\bar{D}$ | $\bar{G}$ | 3 | 5 | 6 | 8 | C | E | $\bar{F}$ | $\bar{H}$ |
| 143 | 1 1 1 1 0 0 0 1 | 0 | 0 | 0 | 0 | 1 | 0 | 0 | 0 | 1 | 1 | 1 | 0 | 0 | 0 | 1 | 1 | 1 | 0 | 0 | 1 | 0 | 1 | 1 | 1 |
| 144 | 0 0 0 0 1 0 0 1 | 1 | 0 | 1 | 0 | 1 | 0 | 0 | 1 | 0 | 0 | 0 | 0 | 1 | 0 | 1 | 1 | 0 | 1 | 0 | 1 | 1 | 1 | 1 | 0 |
| 145 | 1 0 0 0 1 0 0 1 | 0 | 0 | 1 | 1 | 0 | 1 | 0 | 1 | 1 | 0 | 0 | 0 | 0 | 0 | 0 | 1 | 0 | 1 | 0 | 1 | 1 | 0 | 0 | 0 |
| 146 | 0 1 0 0 1 0 0 1 | 1 | 1 | 1 | 0 | 0 | 1 | 1 | 1 | 0 | 1 | 0 | 0 | 1 | 1 | 1 | 0 | 0 | 1 | 0 | 1 | 1 | 0 | 0 | 0 |
| 147 | 1 1 0 0 1 0 0 1 | 0 | 1 | 1 | 1 | 1 | 0 | 1 | 1 | 1 | 1 | 0 | 0 | 0 | 1 | 0 | 0 | 0 | 1 | 0 | 1 | 1 | 1 | 1 | 0 |
| 148 | 0 0 1 0 1 0 0 1 | 1 | 0 | 0 | 0 | 1 | 1 | 1 | 0 | 0 | 0 | 0 | 0 | 1 | 0 | 1 | 0 | 1 | 1 | 0 | 1 | 0 | 1 | 0 | 1 |
| 149 | 1 0 1 0 1 0 0 1 | 0 | 0 | 0 | 1 | 0 | 0 | 1 | 0 | 1 | 0 | 0 | 0 | 0 | 0 | 0 | 0 | 1 | 1 | 0 | 1 | 0 | 0 | 1 | 1 |
| 150 | 0 1 1 0 1 0 0 1 | 1 | 1 | 0 | 0 | 0 | 0 | 0 | 0 | 0 | 1 | 0 | 0 | 1 | 1 | 1 | 1 | 1 | 1 | 0 | 1 | 0 | 0 | 1 | 1 |
| 151 | 1 1 1 0 1 0 0 1 | 0 | 1 | 0 | 1 | 1 | 1 | 0 | 0 | 1 | 1 | 0 | 0 | 0 | 1 | 0 | 1 | 1 | 1 | 0 | 1 | 0 | 1 | 0 | 1 |
| 152 | 0 0 0 1 1 0 0 1 | 0 | 0 | 1 | 0 | 0 | 1 | 1 | 0 | 0 | 0 | 1 | 0 | 0 | 0 | 1 | 0 | 0 | 1 | 0 | 1 | 1 | 0 | 0 | 1 |
| 153 | 1 0 0 1 1 0 0 1 | 1 | 0 | 1 | 1 | 1 | 0 | 1 | 0 | 1 | 0 | 1 | 0 | 1 | 0 | 0 | 0 | 0 | 1 | 0 | 1 | 1 | 1 | 1 | 1 |
| 154 | 0 1 0 1 1 0 0 1 | 0 | 1 | 1 | 0 | 1 | 0 | 0 | 0 | 0 | 1 | 1 | 0 | 0 | 1 | 1 | 0 | 0 | 1 | 0 | 1 | 1 | 1 | 1 | 1 |
| 155 | 1 1 0 1 1 0 0 1 | 1 | 1 | 1 | 1 | 0 | 1 | 0 | 0 | 1 | 1 | 1 | 0 | 1 | 1 | 0 | 1 | 0 | 1 | 0 | 1 | 0 | 0 | 0 | 1 |
| 156 | 0 0 1 1 1 0 0 1 | 0 | 0 | 0 | 0 | 0 | 0 | 0 | 1 | 0 | 0 | 1 | 0 | 0 | 0 | 1 | 1 | 1 | 1 | 0 | 1 | 0 | 0 | 1 | 0 |
| 157 | 1 0 1 1 1 0 0 1 | 1 | 0 | 0 | 1 | 1 | 1 | 0 | 1 | 1 | 0 | 1 | 0 | 1 | 0 | 0 | 1 | 1 | 1 | 0 | 1 | 0 | 1 | 0 | 0 |
| 158 | 0 1 1 1 1 0 0 1 | 0 | 1 | 0 | 0 | 1 | 1 | 1 | 1 | 0 | 1 | 1 | 0 | 0 | 1 | 1 | 0 | 1 | 0 | 1 | 0 | 1 | 0 | 0 | 0 |
| 159 | 1 1 1 1 1 0 0 1 | 1 | 1 | 0 | 1 | 0 | 0 | 1 | 1 | 1 | 1 | 1 | 0 | 1 | 1 | 0 | 0 | 1 | 1 | 0 | 1 | 0 | 0 | 0 | 1 | 0 |
| 160 | 0 0 0 0 0 1 0 1 | 1 | 0 | 0 | 0 | 0 | 0 | 1 | 1 | 0 | 0 | 0 | 0 | 1 | 0 | 1 | 0 | 0 | 0 | 1 | 1 | 0 | 0 | 1 | 0 |
| 161 | 1 0 0 0 0 1 0 1 | 0 | 0 | 0 | 1 | 1 | 1 | 1 | 1 | 1 | 0 | 0 | 0 | 0 | 0 | 0 | 0 | 0 | 0 | 1 | 1 | 0 | 1 | 0 | 0 |
| 162 | 0 1 0 0 0 1 0 1 | 1 | 1 | 0 | 0 | 1 | 1 | 0 | 1 | 0 | 1 | 0 | 0 | 1 | 1 | 1 | 1 | 0 | 0 | 1 | 0 | 1 | 0 | 0 | 0 |
| 163 | 1 1 0 0 0 1 0 1 | 0 | 1 | 0 | 1 | 0 | 0 | 0 | 1 | 1 | 1 | 0 | 0 | 0 | 1 | 0 | 1 | 0 | 0 | 1 | 1 | 0 | 0 | 1 | 0 |
| 164 | 0 0 1 0 0 1 0 1 | 1 | 0 | 1 | 0 | 0 | 1 | 0 | 0 | 0 | 0 | 1 | 0 | 1 | 0 | 1 | 1 | 1 | 0 | 1 | 1 | 1 | 0 | 0 | 1 |
| 165 | 1 0 1 0 0 1 0 1 | 0 | 0 | 1 | 1 | 1 | 0 | 0 | 0 | 1 | 0 | 1 | 0 | 0 | 0 | 0 | 1 | 1 | 0 | 1 | 1 | 1 | 1 | 1 | 1 |
| 166 | 0 1 1 0 0 1 0 1 | 1 | 1 | 1 | 0 | 1 | 0 | 1 | 0 | 0 | 1 | 1 | 0 | 1 | 1 | 1 | 0 | 1 | 0 | 1 | 1 | 1 | 1 | 1 | 1 |
| 167 | 1 1 1 0 0 1 0 1 | 0 | 1 | 1 | 1 | 0 | 1 | 1 | 0 | 1 | 1 | 0 | 0 | 0 | 1 | 0 | 0 | 1 | 0 | 1 | 1 | 1 | 0 | 0 | 1 |
| 168 | 0 0 0 1 0 1 0 1 | 0 | 0 | 0 | 0 | 1 | 1 | 0 | 0 | 0 | 0 | 1 | 0 | 0 | 0 | 1 | 1 | 0 | 0 | 1 | 1 | 0 | 1 | 0 | 1 |
| 169 | 1 0 0 1 0 1 0 1 | 1 | 0 | 0 | 1 | 0 | 0 | 0 | 0 | 1 | 0 | 1 | 0 | 1 | 0 | 0 | 1 | 0 | 0 | 1 | 1 | 0 | 0 | 1 | 1 |
| 170 | 0 1 0 1 0 1 0 1 | 0 | 1 | 0 | 0 | 0 | 0 | 1 | 0 | 0 | 1 | 1 | 0 | 0 | 1 | 1 | 0 | 0 | 0 | 1 | 1 | 0 | 0 | 1 | 1 |
| 171 | 1 1 0 1 0 1 0 1 | 1 | 1 | 0 | 1 | 1 | 1 | 1 | 0 | 1 | 1 | 1 | 0 | 1 | 1 | 0 | 0 | 0 | 0 | 1 | 1 | 0 | 1 | 0 | 1 |
| 172 | 0 0 1 1 0 1 0 1 | 0 | 0 | 1 | 0 | 1 | 0 | 1 | 1 | 0 | 0 | 1 | 0 | 0 | 0 | 1 | 0 | 1 | 0 | 1 | 1 | 1 | 1 | 1 | 0 |
| 173 | 1 0 1 1 0 1 0 1 | 1 | 0 | 1 | 1 | 0 | 1 | 1 | 1 | 1 | 0 | 1 | 0 | 1 | 0 | 0 | 0 | 1 | 0 | 1 | 1 | 1 | 0 | 0 | 0 |
| 174 | 0 1 1 1 0 1 0 1 | 0 | 1 | 1 | 0 | 0 | 1 | 0 | 1 | 0 | 1 | 1 | 0 | 0 | 1 | 1 | 1 | 0 | 1 | 1 | 1 | 0 | 0 | 0 | 0 |
| 175 | 1 1 1 1 0 1 0 1 | 1 | 1 | 1 | 1 | 1 | 0 | 0 | 1 | 1 | 1 | 1 | 0 | 1 | 1 | 0 | 1 | 1 | 0 | 1 | 1 | 1 | 1 | 1 | 0 |
| 176 | 0 0 0 0 1 1 0 1 | 0 | 1 | 0 | 1 | 1 | 0 | 0 | 0 | 0 | 0 | 0 | 0 | 1 | 0 | 1 | 0 | 1 | 1 | 1 | 0 | 1 | 1 | 1 |
| 177 | 1 0 0 0 1 1 0 1 | 1 | 1 | 0 | 0 | 0 | 1 | 0 | 0 | 1 | 0 | 0 | 0 | 1 | 1 | 1 | 0 | 1 | 1 | 1 | 0 | 0 | 0 | 1 |
| 178 | 0 1 0 0 1 1 0 1 | 0 | 0 | 0 | 1 | 0 | 1 | 1 | 0 | 0 | 1 | 0 | 0 | 0 | 0 | 0 | 0 | 1 | 1 | 1 | 0 | 0 | 1 | 1 |
| 179 | 1 1 0 0 1 1 0 1 | 1 | 0 | 0 | 0 | 1 | 0 | 1 | 0 | 1 | 1 | 0 | 0 | 1 | 0 | 1 | 0 | 0 | 1 | 1 | 1 | 0 | 1 | 1 | 1 |
| 180 | 0 0 1 0 1 1 0 1 | 0 | 1 | 1 | 1 | 1 | 1 | 1 | 1 | 0 | 0 | 1 | 0 | 0 | 1 | 0 | 0 | 1 | 0 | 1 | 1 | 1 | 1 | 0 | 0 |
| 181 | 1 0 1 0 1 1 0 1 | 1 | 1 | 1 | 0 | 0 | 0 | 1 | 1 | 1 | 0 | 1 | 0 | 1 | 1 | 1 | 0 | 1 | 1 | 1 | 1 | 1 | 0 | 1 | 0 |
| 182 | 0 1 1 0 1 1 0 1 | 0 | 0 | 1 | 1 | 0 | 0 | 0 | 1 | 0 | 1 | 1 | 0 | 0 | 0 | 0 | 1 | 1 | 1 | 1 | 1 | 1 | 0 | 1 | 0 |
| 183 | 1 1 1 0 1 1 0 1 | 1 | 0 | 1 | 0 | 1 | 1 | 0 | 1 | 1 | 1 | 1 | 0 | 1 | 0 | 1 | 1 | 1 | 1 | 1 | 1 | 1 | 0 | 0 | 0 |
| 184 | 0 0 0 1 1 1 0 1 | 1 | 1 | 0 | 1 | 0 | 1 | 0 | 1 | 0 | 0 | 1 | 0 | 1 | 1 | 0 | 0 | 0 | 1 | 1 | 1 | 0 | 0 | 0 | 0 |
| 185 | 1 0 0 1 1 1 0 1 | 0 | 1 | 0 | 0 | 1 | 0 | 1 | 1 | 1 | 0 | 1 | 0 | 1 | 1 | 0 | 0 | 0 | 1 | 1 | 1 | 0 | 1 | 1 | 0 |
| 186 | 0 1 0 1 1 1 0 1 | 1 | 0 | 0 | 1 | 1 | 0 | 0 | 1 | 0 | 1 | 1 | 0 | 1 | 0 | 1 | 0 | 1 | 1 | 1 | 1 | 0 | 1 | 1 | 0 |
| 187 | 1 1 0 1 1 1 0 1 | 0 | 0 | 0 | 0 | 0 | 1 | 0 | 1 | 1 | 1 | 1 | 0 | 0 | 0 | 1 | 1 | 0 | 1 | 1 | 1 | 0 | 0 | 0 | 0 |
| 188 | 0 0 1 1 1 1 0 1 | 1 | 1 | 1 | 1 | 0 | 0 | 0 | 0 | 0 | 0 | 1 | 1 | 1 | 1 | 0 | 1 | 1 | 1 | 1 | 1 | 1 | 0 | 1 | 1 |
| 189 | 1 0 1 1 1 1 0 1 | 0 | 1 | 1 | 0 | 1 | 1 | 0 | 0 | 1 | 0 | 1 | 0 | 1 | 1 | 1 | 1 | 1 | 1 | 1 | 1 | 1 | 1 | 0 | 1 |
| 190 | 0 1 1 1 1 1 0 1 | 1 | 0 | 1 | 1 | 1 | 1 | 1 | 0 | 0 | 1 | 1 | 0 | 1 | 0 | 0 | 1 | 1 | 1 | 1 | 1 | 1 | 1 | 1 | 0 |
| 191 | 1 1 1 1 1 1 0 1 | 0 | 0 | 1 | 0 | 0 | 0 | 1 | 0 | 1 | 1 | 1 | 0 | 0 | 0 | 1 | 0 | 1 | 1 | 1 | 1 | 1 | 0 | 1 | 0 |
| 192 | 0 0 0 0 0 0 1 1 | 1 | 0 | 0 | 1 | 0 | 1 | 1 | 0 | 0 | 0 | 0 | 1 | 1 | 0 | 0 | 0 | 0 | 0 | 0 | 1 | 0 | 0 | 0 | 1 |
| 193 | 1 0 0 0 0 0 1 1 | 0 | 0 | 0 | 0 | 1 | 0 | 1 | 0 | 1 | 0 | 0 | 1 | 0 | 0 | 0 | 0 | 0 | 0 | 0 | 1 | 0 | 1 | 1 | 1 |
| 194 | 0 1 0 0 0 0 1 1 | 1 | 1 | 0 | 1 | 1 | 0 | 0 | 0 | 0 | 1 | 0 | 1 | 1 | 1 | 0 | 1 | 0 | 0 | 0 | 1 | 1 | 1 | 1 | 1 |
| 195 | 1 1 0 0 0 0 1 1 | 0 | 1 | 0 | 0 | 0 | 1 | 0 | 0 | 1 | 1 | 0 | 1 | 0 | 1 | 1 | 1 | 0 | 0 | 0 | 1 | 0 | 0 | 0 | 1 |
| 196 | 0 0 1 0 0 0 1 1 | 1 | 0 | 1 | 1 | 0 | 0 | 0 | 1 | 0 | 0 | 1 | 0 | 1 | 1 | 0 | 1 | 1 | 0 | 1 | 1 | 0 | 1 | 0 |
| 197 | 1 0 1 0 0 0 1 1 | 0 | 0 | 1 | 0 | 1 | 1 | 1 | 0 | 1 | 0 | 0 | 0 | 1 | 0 | 0 | 1 | 1 | 0 | 1 | 1 | 1 | 0 | 0 |
| 198 | 0 1 1 0 0 0 1 1 | 1 | 1 | 1 | 1 | 1 | 1 | 1 | 1 | 0 | 1 | 0 | 1 | 1 | 1 | 0 | 0 | 1 | 0 | 1 | 1 | 1 | 0 | 0 |
| 199 | 1 1 1 0 0 0 1 1 | 0 | 1 | 1 | 0 | 0 | 0 | 1 | 1 | 1 | 1 | 0 | 1 | 0 | 1 | 0 | 1 | 0 | 0 | 1 | 1 | 0 | 1 | 0 |
| 200 | 0 0 0 1 0 0 1 1 | 0 | 0 | 0 | 1 | 1 | 0 | 0 | 1 | 0 | 0 | 1 | 1 | 0 | 0 | 0 | 1 | 0 | 0 | 0 | 1 | 0 | 1 | 1 | 0 |
| 201 | 1 0 0 1 0 0 1 1 | 1 | 0 | 0 | 0 | 0 | 1 | 0 | 1 | 1 | 0 | 1 | 1 | 0 | 1 | 1 | 0 | 0 | 0 | 0 | 1 | 0 | 0 | 0 | 0 |
| 202 | 0 1 0 1 0 0 1 1 | 0 | 1 | 0 | 1 | 0 | 1 | 1 | 0 | 0 | 1 | 1 | 0 | 1 | 0 | 0 | 0 | 0 | 0 | 0 | 1 | 0 | 0 | 0 | 0 |
| 203 | 1 1 0 1 0 0 1 1 | 1 | 1 | 0 | 0 | 1 | 0 | 1 | 1 | 1 | 1 | 1 | 1 | 1 | 1 | 0 | 0 | 0 | 0 | 0 | 1 | 0 | 1 | 1 | 0 |
| 204 | 0 0 1 1 0 0 1 1 | 0 | 0 | 1 | 1 | 1 | 1 | 1 | 0 | 0 | 1 | 1 | 1 | 0 | 0 | 0 | 1 | 0 | 0 | 1 | 1 | 0 | 1 | 0 | 1 |
| 205 | 1 0 1 1 0 0 1 1 | 1 | 0 | 1 | 0 | 0 | 0 | 1 | 0 | 1 | 0 | 1 | 1 | 0 | 1 | 0 | 1 | 0 | 0 | 1 | 1 | 0 | 1 | 0 | 1 |
| 206 | 0 1 1 1 0 0 1 1 | 0 | 1 | 1 | 1 | 0 | 0 | 0 | 0 | 0 | 1 | 1 | 1 | 0 | 1 | 1 | 1 | 0 | 0 | 1 | 1 | 0 | 1 | 1 | 0 |
| 207 | 1 1 1 1 0 0 1 1 | 1 | 1 | 1 | 0 | 1 | 1 | 0 | 0 | 1 | 1 | 1 | 1 | 1 | 1 | 1 | 1 | 0 | 0 | 1 | 1 | 1 | 0 | 1 | 1 |
| 208 | 0 0 0 0 1 0 1 1 | 0 | 1 | 0 | 0 | 1 | 1 | 0 | 1 | 0 | 0 | 0 | 1 | 0 | 1 | 1 | 0 | 1 | 0 | 0 | 1 | 1 | 0 | 0 | 0 |
| 209 | 1 0 0 0 1 0 1 1 | 1 | 1 | 0 | 1 | 0 | 0 | 1 | 1 | 1 | 0 | 0 | 1 | 1 | 1 | 1 | 0 | 1 | 0 | 1 | 0 | 0 | 0 | 1 | 0 |
| 210 | 0 1 0 0 1 0 1 1 | 0 | 0 | 0 | 0 | 0 | 1 | 1 | 0 | 0 | 1 | 0 | 1 | 0 | 1 | 0 | 0 | 1 | 0 | 1 | 0 | 1 | 0 | 0 | 0 |
| 211 | 1 1 0 0 1 0 1 1 | 1 | 0 | 0 | 1 | 1 | 1 | 1 | 1 | 1 | 1 | 0 | 1 | 1 | 0 | 0 | 0 | 1 | 0 | 1 | 0 | 1 | 0 | 1 | 0 |
| 212 | 0 0 1 0 1 0 1 1 | 0 | 1 | 1 | 0 | 2 | 0 | 1 | 0 | 0 | 0 | 1 | 1 | 0 | 1 | 1 | 0 | 2 | 2 | 0 | 1 | 1 | 1 | 1 | 1 |
| 213 | 1 0 1 0 1 0 1 1 | 1 | 1 | 1 | 1 | 1 | 0 | 1 | 1 | 1 | 0 | 1 | 1 | 1 | 1 | 0 | 0 | 1 | 1 | 0 | 1 | 1 | 1 | 0 | 0 | 1 |
| 214 | 0 1 1 0 1 0 1 1 | 0 | 0 | 1 | 0 | 1 | 1 | 0 | 0 | 0 | 1 | 1 | 0 | 0 | 1 | 1 | 1 | 1 | 0 | 1 | 1 | 0 | 0 | 0 | 1 |
| 215 | 1 1 1 0 1 0 1 1 | 1 | 0 | 1 | 1 | 1 | 0 | 0 | 0 | 1 | 1 | 1 | 0 | 1 | 0 | 0 | 1 | 1 | 0 | 1 | 1 | 1 | 1 | 1 | 1 |
| 216 | 0 0 0 1 1 0 1 1 | 1 | 1 | 0 | 0 | 0 | 0 | 1 | 0 | 0 | 0 | 1 | 1 | 1 | 1 | 0 | 0 | 1 | 0 | 1 | 0 | 0 | 1 | 1 |
| 217 | 1 0 0 1 1 0 1 1 | 0 | 1 | 0 | 1 | 1 | 1 | 0 | 0 | 1 | 0 | 1 | 0 | 1 | 0 | 0 | 0 | 1 | 0 | 1 | 0 | 0 | 1 | 0 | 1 |
| 218 | 0 1 0 1 1 0 1 1 | 1 | 0 | 0 | 0 | 1 | 1 | 0 | 0 | 0 | 1 | 1 | 0 | 1 | 1 | 1 | 0 | 1 | 0 | 1 | 0 | 1 | 0 | 1 | 1 |
| 219 | 1 1 0 1 1 0 1 1 | 0 | 0 | 0 | 1 | 0 | 0 | 0 | 0 | 1 | 1 | 1 | 0 | 0 | 0 | 1 | 0 | 1 | 0 | 1 | 0 | 0 | 0 | 1 | 1 |
| 220 | 0 0 1 1 1 0 1 1 | 1 | 1 | 1 | 0 | 0 | 1 | 0 | 1 | 0 | 0 | 1 | 1 | 1 | 1 | 1 | 1 | 1 | 0 | 1 | 1 | 0 | 0 | 0 | 0 |

TABLE II-continued

| DATA WORD | STANDARD ERROR CORRECTING CODE | | | | | | | | | | | | | | | | | | | | | | | | |
|---|---|---|---|---|---|---|---|---|---|---|---|---|---|---|---|---|---|---|---|---|---|---|---|---|---|
| | 1x | | | | | | | | 2x | | | | | | | | IMPROVED ERROR CORRECTING CODE | | | | | | | | | |
| | | | | | | | | | | | | | | | | | 1y | | | | | | 2y | | | |
| x | 1 2 3 4 5 6 7 8 | | | | | | | | A | B | C | D | E | F | G | H | 1 | 2 | 4 | 7 | A | B | D̄ | Ḡ | 3 5 6 8 | C E F̄ H̄ |
| 221 | 1 0 1 1 1 0 1 1 | | | | | | | | 0 | 1 | 1 | 1 | 1 | 0 | 0 | 1 | 1 | 0 | 1 | 1 | 0 | 1 | 0 | 1 | 1 1 0 1 | 1 1 1 0 |
| 222 | 0 1 1 1 1 0 1 1 | | | | | | | | 1 | 0 | 1 | 0 | 1 | 0 | 1 | 1 | 0 | 1 | 1 | 1 | 1 | 0 | 1 | 0 | 1 1 0 1 | 1 1 1 0 |
| 223 | 1 1 1 1 1 0 1 1 | | | | | | | | 0 | 0 | 1 | 1 | 0 | 1 | 1 | 1 | 1 | 1 | 1 | 1 | 0 | 0 | 0 | 0 | 1 1 0 1 | 1 0 0 0 |
| 224 | 0 0 0 0 0 1 1 1 | | | | | | | | 0 | 1 | 1 | 0 | 0 | 1 | 1 | 1 | 0 | 0 | 0 | 1 | 0 | 1 | 1 | 0 | 0 0 1 1 | 1 0 0 0 |
| 225 | 1 0 0 0 0 1 1 1 | | | | | | | | 1 | 1 | 1 | 1 | 1 | 0 | 1 | 1 | 1 | 0 | 0 | 1 | 1 | 1 | 0 | 0 | 0 0 1 1 | 1 1 1 0 |
| 226 | 0 1 0 0 0 1 1 1 | | | | | | | | 0 | 0 | 1 | 0 | 1 | 0 | 0 | 1 | 0 | 1 | 0 | 1 | 0 | 0 | 1 | 1 | 0 0 1 1 | 1 1 1 0 |
| 227 | 1 1 0 0 0 1 1 1 | | | | | | | | 1 | 0 | 1 | 1 | 0 | 1 | 0 | 1 | 1 | 1 | 0 | 1 | 1 | 0 | 0 | 1 | 0 0 1 1 | 1 0 0 0 |
| 228 | 0 0 1 0 0 1 1 1 | | | | | | | | 0 | 1 | 0 | 0 | 0 | 0 | 0 | 0 | 0 | 0 | 0 | 1 | 0 | 1 | 1 | 1 | 1 0 1 1 | 0 0 1 1 |
| 229 | 1 0 1 0 0 1 1 1 | | | | | | | | 1 | 1 | 0 | 1 | 1 | 1 | 0 | 0 | 1 | 0 | 0 | 1 | 1 | 1 | 0 | 1 | 1 0 1 1 | 0 1 0 1 |
| 230 | 0 1 1 0 0 1 1 1 | | | | | | | | 0 | 0 | 0 | 0 | 1 | 1 | 1 | 0 | 0 | 1 | 0 | 1 | 0 | 0 | 1 | 0 | 1 0 1 1 | 0 1 0 1 |
| 231 | 1 1 1 0 0 1 1 1 | | | | | | | | 1 | 0 | 0 | 1 | 0 | 0 | 1 | 0 | 1 | 1 | 0 | 1 | 1 | 0 | 0 | 0 | 1 0 1 1 | 0 0 1 1 |
| 232 | 0 0 0 1 0 1 1 1 | | | | | | | | 1 | 1 | 1 | 0 | 1 | 0 | 0 | 0 | 0 | 0 | 1 | 1 | 1 | 1 | 1 | 1 | 0 0 1 1 | 1 1 1 1 |
| 233 | 1 0 0 1 0 1 1 1 | | | | | | | | 0 | 1 | 1 | 1 | 0 | 1 | 0 | 0 | 1 | 0 | 1 | 1 | 0 | 1 | 0 | 1 | 0 0 1 1 | 1 0 0 1 |
| 234 | 0 1 0 1 0 1 1 1 | | | | | | | | 1 | 0 | 1 | 0 | 0 | 1 | 1 | 0 | 0 | 1 | 1 | 1 | 1 | 0 | 1 | 0 | 0 0 1 1 | 1 0 0 1 |
| 235 | 1 1 0 1 0 1 1 1 | | | | | | | | 0 | 0 | 1 | 1 | 1 | 0 | 1 | 0 | 1 | 1 | 1 | 1 | 0 | 0 | 0 | 0 | 0 0 1 1 | 1 1 1 1 |
| 236 | 0 0 1 1 0 1 1 1 | | | | | | | | 1 | 1 | 0 | 0 | 1 | 1 | 1 | 1 | 0 | 0 | 1 | 1 | 1 | 1 | 0 | 1 | 1 0 1 1 | 0 1 0 0 |
| 237 | 1 0 1 1 0 1 1 1 | | | | | | | | 0 | 1 | 0 | 1 | 0 | 0 | 1 | 1 | 1 | 0 | 1 | 1 | 0 | 1 | 0 | 0 | 1 0 1 1 | 0 0 1 0 |
| 238 | 0 1 1 1 0 1 1 1 | | | | | | | | 1 | 0 | 0 | 0 | 0 | 0 | 1 | 1 | 0 | 1 | 1 | 1 | 1 | 0 | 1 | 1 | 1 0 1 1 | 0 0 1 0 |
| 239 | 1 1 1 1 0 1 1 1 | | | | | | | | 0 | 0 | 0 | 1 | 1 | 1 | 0 | 1 | 1 | 1 | 1 | 1 | 0 | 0 | 0 | 1 | 1 0 1 1 | 0 1 0 0 |
| 240 | 0 0 0 0 1 1 1 1 | | | | | | | | 1 | 0 | 1 | 1 | 1 | 1 | 0 | 0 | 0 | 0 | 0 | 1 | 1 | 0 | 0 | 1 | 0 1 1 1 | 1 1 0 1 |
| 241 | 1 0 0 0 1 1 1 1 | | | | | | | | 0 | 0 | 1 | 0 | 0 | 0 | 0 | 0 | 1 | 0 | 0 | 1 | 0 | 0 | 1 | 1 | 0 1 1 1 | 1 0 1 1 |
| 242 | 0 1 0 0 1 1 1 1 | | | | | | | | 1 | 1 | 1 | 1 | 0 | 0 | 1 | 0 | 0 | 1 | 0 | 1 | 1 | 0 | 0 | 1 | 0 1 1 1 | 1 0 1 1 |
| 243 | 1 1 0 0 1 1 1 1 | | | | | | | | 0 | 1 | 1 | 0 | 1 | 1 | 1 | 0 | 1 | 1 | 0 | 1 | 0 | 1 | 1 | 0 | 0 1 1 1 | 1 1 0 1 |
| 244 | 0 0 1 0 1 1 1 1 | | | | | | | | 1 | 0 | 0 | 1 | 1 | 0 | 1 | 1 | 0 | 0 | 0 | 1 | 1 | 0 | 0 | 0 | 1 1 1 1 | 0 1 1 0 |
| 245 | 1 0 1 0 1 1 1 1 | | | | | | | | 0 | 0 | 0 | 0 | 0 | 1 | 1 | 1 | 1 | 0 | 0 | 1 | 0 | 0 | 1 | 0 | 1 1 1 1 | 0 0 0 0 |
| 246 | 0 1 1 0 1 1 1 1 | | | | | | | | 1 | 1 | 0 | 1 | 0 | 1 | 0 | 1 | 0 | 1 | 0 | 1 | 1 | 1 | 0 | 1 | 1 1 1 1 | 0 0 0 0 |
| 247 | 1 1 1 0 1 1 1 1 | | | | | | | | 0 | 1 | 0 | 0 | 1 | 0 | 0 | 1 | 1 | 1 | 0 | 1 | 0 | 1 | 1 | 1 | 1 1 1 1 | 0 1 1 0 |
| 248 | 0 0 0 1 1 1 1 1 | | | | | | | | 0 | 0 | 1 | 1 | 0 | 0 | 1 | 1 | 0 | 0 | 1 | 1 | 0 | 0 | 0 | 0 | 0 1 1 1 | 1 0 1 0 |
| 249 | 1 0 0 1 1 1 1 1 | | | | | | | | 1 | 0 | 1 | 0 | 1 | 1 | 1 | 1 | 1 | 0 | 1 | 1 | 1 | 0 | 1 | 0 | 0 1 1 1 | 1 0 0 0 |
| 250 | 0 1 0 1 1 1 1 1 | | | | | | | | 0 | 1 | 1 | 1 | 1 | 0 | 1 | 1 | 0 | 1 | 1 | 1 | 0 | 1 | 0 | 1 | 1 1 1 1 | 1 1 0 0 |
| 251 | 1 1 0 1 1 1 1 1 | | | | | | | | 1 | 1 | 1 | 0 | 0 | 0 | 0 | 1 | 1 | 1 | 1 | 1 | 1 | 1 | 1 | 0 | 1 1 1 1 | 1 0 1 0 |
| 252 | 0 0 1 1 1 1 1 1 | | | | | | | | 0 | 0 | 0 | 1 | 0 | 1 | 0 | 0 | 0 | 0 | 1 | 1 | 0 | 0 | 0 | 1 | 1 1 1 1 | 0 0 0 1 |
| 253 | 1 0 1 1 1 1 1 1 | | | | | | | | 1 | 0 | 0 | 0 | 1 | 0 | 0 | 0 | 1 | 0 | 1 | 1 | 1 | 0 | 1 | 1 | 1 1 1 1 | 0 1 1 1 |
| 254 | 0 1 1 1 1 1 1 1 | | | | | | | | 0 | 1 | 0 | 1 | 1 | 0 | 1 | 0 | 0 | 1 | 1 | 1 | 0 | 1 | 0 | 0 | 1 1 1 1 | 0 1 1 1 |
| 255 | 1 1 1 1 1 1 1 1 | | | | | | | | 1 | 1 | 0 | 0 | 0 | 1 | 1 | 0 | 1 | 1 | 1 | 1 | 1 | 1 | 1 | 0 | 1 1 1 1 | 0 0 0 1 |

The present invention transmits two transmission data words $^1Y$ and $^2Y$ in place of $^1X$ and $^2X$. $^1Y$ and $^2Y$ are derived from $^1X$ and $^2X$. The transformation in question operates by exchanging the data in various bit positions and by complementing the data in specified bit positions prior to said data being exchanged. This is illustrated in Table II by the labels over the various bit positions in $^1X$, $^2X$, $^1Y$, and $^2Y$. The bit positions in $^1X$ are labeled "1" through "8". The bit positions in $^2X$ are labeled "A" through "H". The data used to generated $^1Y$ and $^2Y$ is shown over the columns labeled $^1Y$ and $^2Y$. For example, the first bit of $^1Y$ is obtained by copying the data in the first position of $^1X$. The second bit of $^1Y$ is obtained by copying the data in the section bit position of $^1X$. And, the eighth bit of $^1Y$ is obtained by copying the data in the seventh bit position of $^2X$ and complementing said data, as indicated by the bar over the letter G.

This method for generating the transmission words, $^1Y$ and $^2Y$, is preferred because conventional circuitry for generating $^1X$ and $^2X$ from a user data word x using a BCH code is inexpensive and readily available. The above described transformation is also easily implemented since it can be carried out by placing $^1X$ and $^2X$ in a first set of registers, copying the data to a second set of registers, and then connecting the corresponding bit positions by conducting paths. For those bit positions in which the data is to be complemented, inverters are placed in the conducting paths in question.

Similarly, the decryption process may advantageously utilize conventional circuitry for decrypting the BCH code in question. The transmission data words are placed in a first set of registers. The data in these registers is then copied into a second set of registers by connecting corresponding bit positions by conducting paths which include inverters in selected paths. The data in the second set of registers is then decrypted using the conventional BCH hardware.

It should be noted that the transformation in question begins and ends with the conventional BCH code. Hence, it has the same error detecting and correcting capabilities as the conventional code.

Having provided the above discussion of the basic elements of a computer network adapted for utilizing a $T_1$ interface unit according to the present invention, a more detailed description of such a $T_1$ interface unit will now be given.

Figure 4:
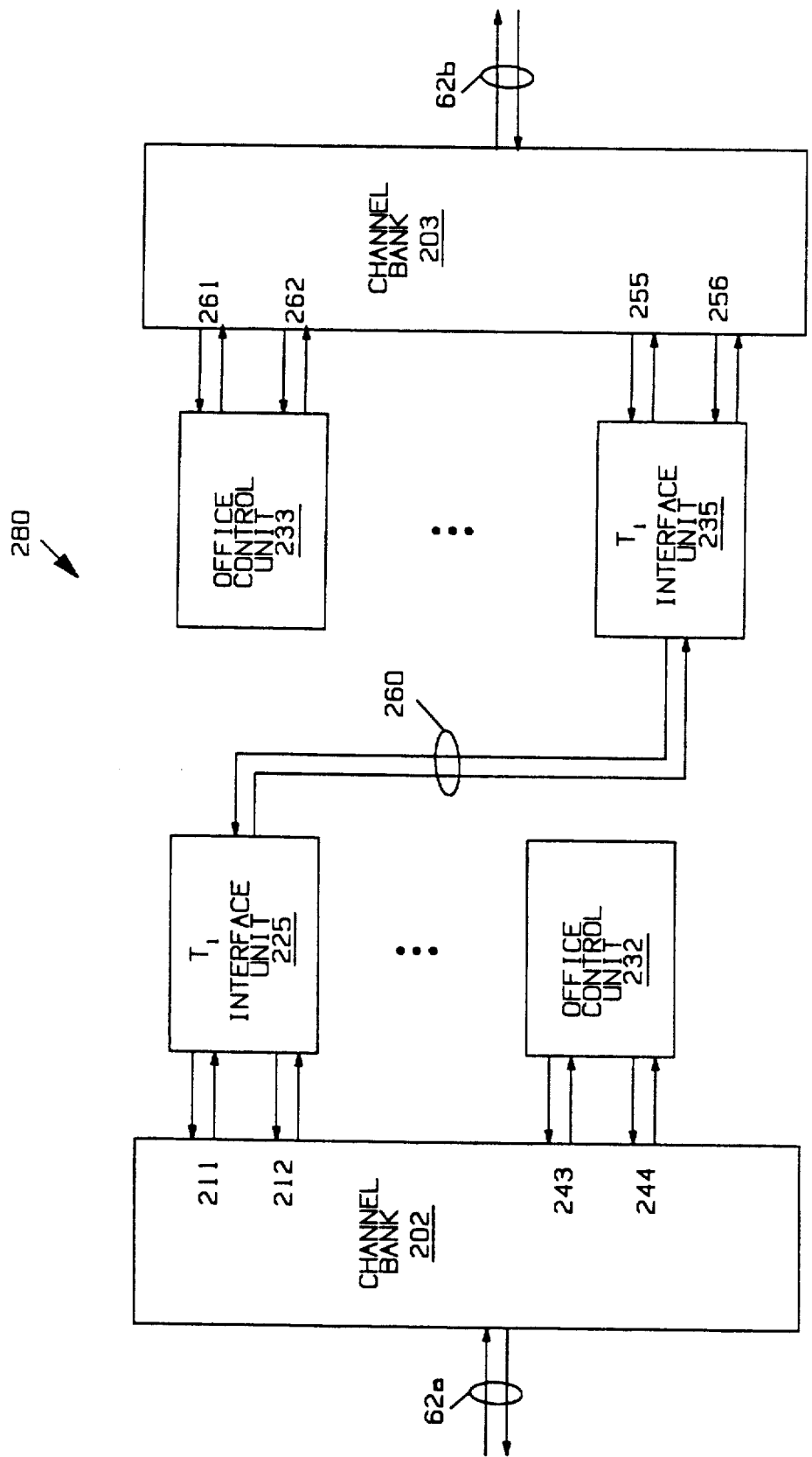
FIG. 4 illustrates a data transfer between two $T_1$ channels utilizing two $T_1$ interface units according to the present invention.

FIG. 4 is a more detailed illustration of the manner in which two $T_1$ interface units 225 and 235 according to the present invention are used to effect a cross-connection between two $T_1$ channels. In the preferred embodiment of the present invention, a $T_1$ interface unit is similar to an adaptive office control unit in that it is a plug-in unit for a conventional channel bank of the type described with reference to FIG. 3 above. Each $T_1$ interface unit occupies two slots in such a channel bank. If the additional error correction feature on the $T_1$ communication links which utilizes the second $T_1$ channel described above is not operative, only one of these slots is actually utilized. Hence, $T_1$ interface unit 225 is connected to slots 211 and 212 of channel bank 202, and $T_1$ interface unit 235 is connected to slots 255 and 256 of channel bank 203. The remaining slots of channel banks 202 and 203 may be used for other network units or other uses within the telephone system. Hence, exemplary adaptive office control units 232 and 233 are shown connected to slots 243 and 244 and to 261 and 262, respectively.

Each $T_1$ interface unit 225 receives data from slots 211 and 212. If the error correcting channel is operative, the data is decrypted, thus correcting for transmission errors on $T_1$ communication link 62a. In addition, any errors that can be corrected using the majority decision algorithms discussed above are also corrected. The corrected data is then transmitted to $T_1$ interface unit 235 over communication link 260 which is preferably a twisted pair within the central office housing channel banks 202 and 203. Upon receiving the corrected data, $T_1$ interface unit 235 repeats each byte the appropriate number of times. If the error correcting channel is operative, each byte is then encrypted and transmitted via slots 255 and 256 in the appropriate channels of $T_1$ communication link 62b. If the error correcting channel is not operative, each byte is transmitted without encryption via one channel of $T_1$ communication link 62b. Data flowing in the reverse direction is handled in a similar fashion.

Since the channel serviced by any given slot in a channel bank is determined by the location of that slot in the channel bank, data in any first channel of $T_1$ communication link 62a can be transferred to any second channel of $T_1$ communication link 62b by choosing the appropriate slots in channel banks 202 and 203 to house the $T_1$ interface units.

Figure 5:
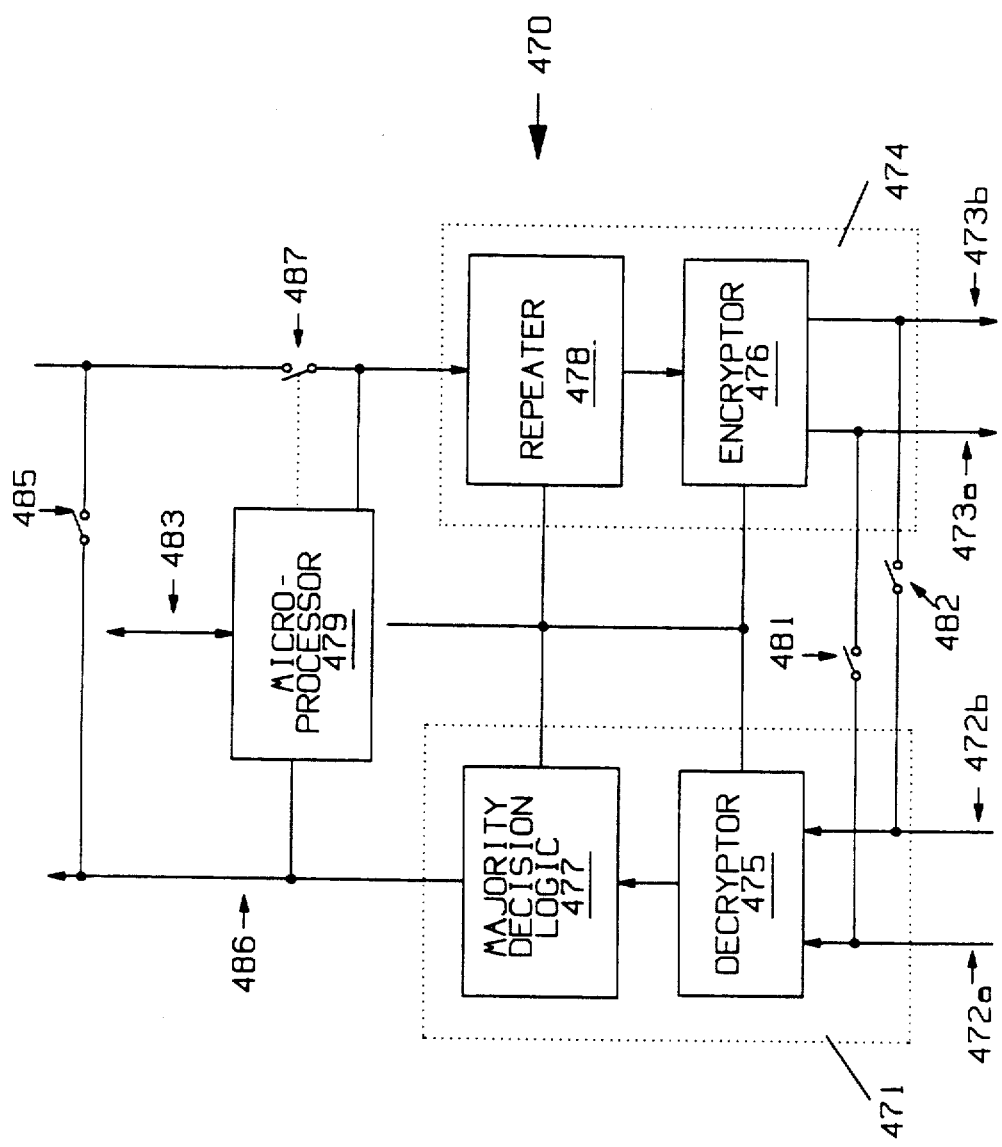
FIG. 5 is a block diagram of the preferred embodiment of a $T_1$ interface unit according to the present invention.

A block diagram of a $T_1$ interface unit, such as 225 and 235 in FIG. 4, is shown in FIG. 5. $T_1$ interface unit 470 includes an input port 471. Input port 471 is connected to two incoming lines 472a and 472b which are used to receive bytes of data from primary and secondary channels connected thereto. As noted above, the use of the error correcting feature which utilizes both $T_1$ channels is optional. If this error correcting feature is enabled, data is received on both of lines 472a and 472b. If this feature is disabled, data is received only on line 472a.

Input lines 472a and 472b are connected to a decryptor 475 which is used to decrypt the error encrypted data present on lines 472a and 472b when the error correcting feature is operative. Decryptor 475 operates on two bytes of data, one being received on line 472a and the other being received on line 472b, to generate a single error corrected byte which is output from decryptor 475. When the error correcting feature is inoperative, decryptor 475 merely copies each byte received on line 472a to the output of decryptor 475.

As noted above, when the computer network is transmitting data at rates below 38.4 Kbits/sec, each byte (i.e., a 7-bit frame segment together with an added "1") is repeated a number of times on the $T_1$ communication link in successive $T_1$ frames, the number of repeats being a function of the data transmission rate. These repeated bytes are combined to form a further corrected byte using majority decision logic by majority decision circuit 477 which receives the bytes output from decryptor 475.

Similarly, $T_1$ interface unit 470 includes an output port 474 which is connected to two outgoing lines 473a and 473b which are used to transmit bytes of data to the primary and secondary channels connected thereto. Encryptor 476 receives its data from a repeater 478 which repeats each byte of data input thereto a predetermined number of times, the number depending on the data transmission rate of the computer network. Each byte generated by repeater 478 is transmitted to an encryptor 476 which is connected to output lines 473a and 473b. If the error correcting feature is operative, encryptor 478 encrypts each byte input thereto using the error correcting code described above and transmits the two bytes so generated on output lines 473a and 473b. If the error correcting feature is not operative, encryptor 476 merely copies each byte input thereto to output line 473a.

Figure 6A:
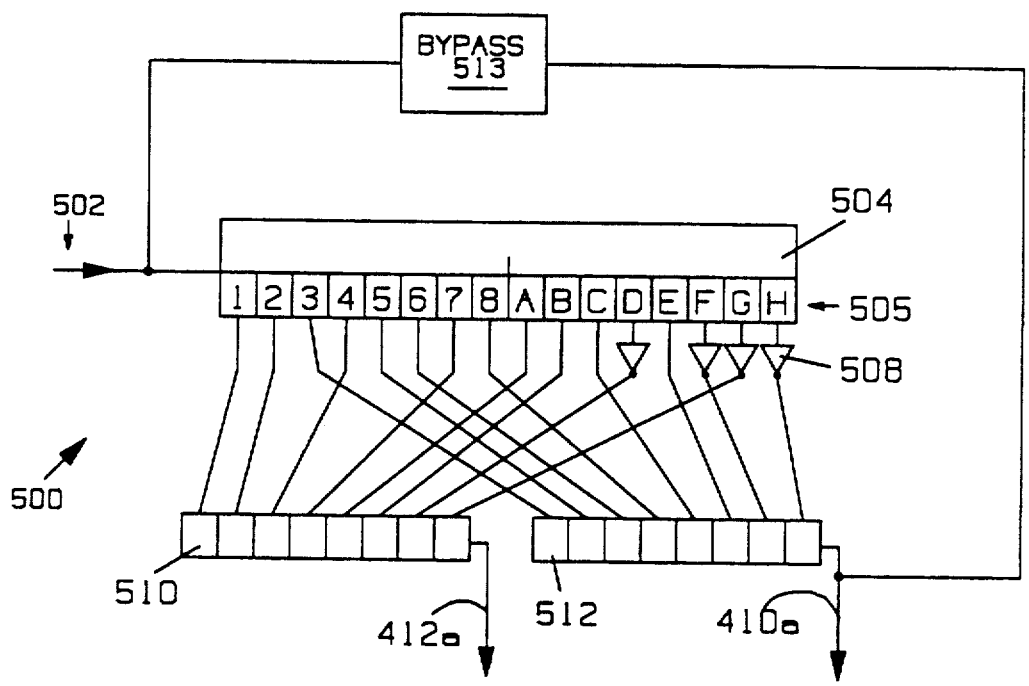
FIG. 6(a) is a block diagram of an encryption circuit utilized in the preferred embodiment of the present invention.

A block diagram of the preferred embodiment of error code encryption circuit 476 according to the present invention is shown in in FIG. 6(a). The error code used by this circuit is given in Table II.

A data byte received from repeater 478 on line 502 is loaded into cyclic code generating circuit 504 which converts each 8-bit data word into a 16-bit encrypted word which is stored in 16-bit register 505. The individual bits of register 505 are labeled 1 through 8 and A through H. These two 8-bit data words correspond to $^1X$ and $^2X$ shown in Table II. The 16-bit encrypted word stored in register 505 is transformed into two transmission words by connecting each bit in register 505 to a corresponding bit in one of two shift registers 510 and 512. These two transmission words correspond to $^1Y$ and $^2Y$ shown in Table II. Those bit positions in register 505 that are to be complemented are connected to the corresponding bit positions in the shift registers through inverters of which inverter 508 is typical. These connections form a hardwired transformation of the conventional error correcting code to an error correcting code according to the present invention. The transformed error correcting code is then shifted out onto lines 412a and 410a.

Figure 6B:
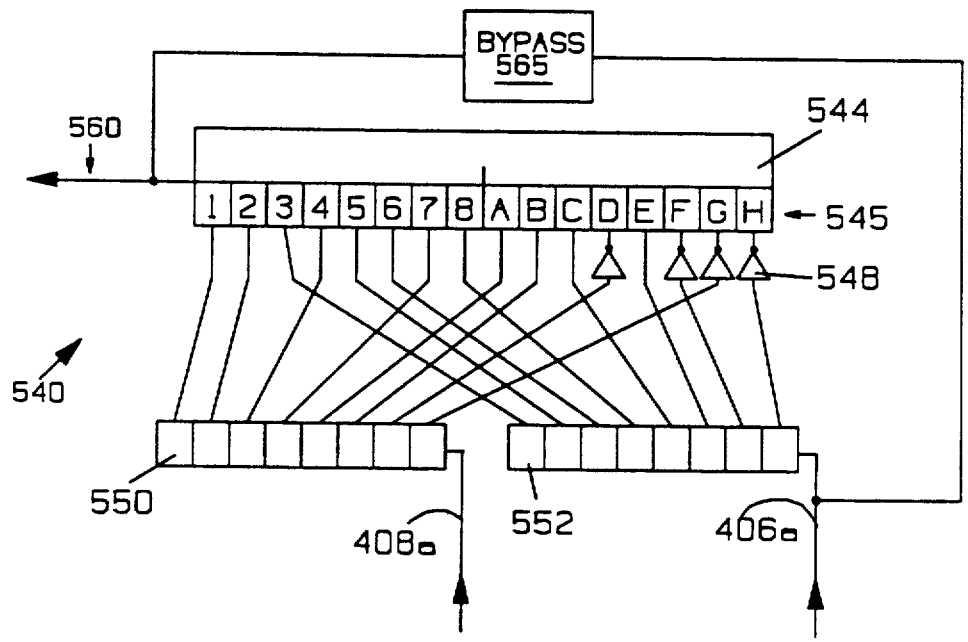
FIG. 6(b) is a block diagram of a decryption circuit utilized in the preferred embodiment of the present invention.

A block diagram of decryptor 475 is shown in FIG. 6(b). The two encrypted bytes received on lines 406a and 408a are loaded into registers 550 and 552. The data in these registers is transferred to a 16-bit register 545 in a cyclic code decoding circuit 544. The data in question is transferred by connecting the individual bits of shift registers 550 and 552 to register 545 such that the inverse of the transformation between register 505 and shift registers 510 and 512 is performed. Once loaded, the contents of register 545 are decoded using the conventional cyclic code decoding circuitry. The resulting 8-bit data word is then outputted to majority decision logic circuit 477 on line 560.

When the error correcting feature is not operating, the encryption and decrytion functions are replaced by copying data to and from the appropriate $T_1$ channels. Bypass circuits 513 and 565 are utilized for this purpose. When the error correcting feature is disabled, bypass circuit 513 copies the data input on line 502 to line 410a which is connected to the primary $T_1$ channel. Similarly, bypass circuit 565 copies the data from the primary $T_1$ channel on line 406a to output line 560.

Referring again to FIG. 5, a switch 487 which is under the control of microprocessor 479 is present in the input line to repeater 478. When microprocessor 479 needs to insert a command into the data stream passing through the data port, this switch is utilized to interrupt the flow of data so that microprocessor 479 may introduce new data into the next frame transmitted from the data port.

The $T_1$ interface unit 470 also includes a command port 483 which is used to connect the $T_1$ interface unit 470 to a network control computer which may be used to insert commands into the data streams flowing through the $T_1$ interface unit 470 or to read data flowing in said streams. The use of such inserted commands will be discussed in more detail below. For the purpose of this discussion it should be noted that commands inserted through command port 483 are copied to the microprocessor 479. Commands not intended for the $T_1$ interface unit 470 are copied in both the "upstream" and "downstream" directions to the other network units connected to the $T_1$ interface unit 470.

As will be discussed in more detail below, the present invention includes provisions for setting loopbacks for use in diagnosing network malfunctions. Switches 481 and 482, which are also under the control of microprocessor 479, are utilized to set these loopbacks. When closed, switch 481 causes all data input on line 472a to be output on line 473a. Switch 482 operates in a like manner between lines 472b and 473b. Similarly, switch 485 may be used to loopback data on lines 485 and 486.

Microprocessor 479 monitors the data leaving majority decision circuit 479. When the computer network is transmitting data in a framed format, microprocessor 479 reconstructs each frame received on input lines 472a and 472b from the individual bytes of data. It records errors detected using the error correcting data in each frame; however, it makes no attempt to correct errors using the ECC bits. Finally, it examines the command and address data in each frame to determine if the command data contains a command directed to it. If such a command is present, it executes the command.

If the computer network is operating in the 64 Kbits/sec mode in which data is not transmitted in frames, microprocessor 479 merely examines successive bytes of data in search of a predetermined sequence of bytes which is used to instruct it to switch back to the framed transmission mode.

Microprocessor 479 can also transmit commands including data specifying its current status and observed error rates. Such transmissions are made in response to commands that are either received in a frame from another network unit or input from command port 483. These commands are included in the command data fields of the next frame transmitted by the $T_1$ interface unit 470, by replacing the command data in that frame with the command data in question. As noted above, switch 487 may be utilized to perform this replacement prior to the data being input to repeater 477.

When operating in the framed mode, a $T_1$ interface unit according to the present invention unpacks the data in a frame 84 received thereby by detecting the beginning of the frame using the synchronization data described with reference to field 91 of loop frame 90. The frame is unpacked by the microprocessor 479 receiving the frame. The microprocessor 479 extracts the command and address data. Some of the commands utilize other data fields of loop frame 90 to communicate further data needed by the command. If the command in question utilizes this additional data, the data in the fields in question is also extracted. Some of these commands may not be given when the user is transmitting data on the computer network, since the commands utilize the fields reserved for user data.

Each $T_1$ interface unit includes a register, preferably included in the microprocessor, for storing an address identifying the $T_1$ interface unit in question. When a command is received by a data port, the microprocessor therein checks the address specified in the received frame 84 to determine if the command is to be executed by the $T_1$ interface unit in question.

The microprocessor in the $T_1$ interface unit also generates command data in response to a received command. This data is inserted in the command data fields in the next frame transmitted by the $T_1$ interface unit. As noted above, the $T_1$ interface unit also includes a command port which provides a means for telephone service technicians to insert commands in the telephone system computer network.

Secure Commands

The present invention provides a security mechanism to insure that network commands originating from an adaptive digital service unit are restricted such that a user cannot use an option that is not subscribed or change the network configuration in a manner that might introduce problems into the telephone system. The mechanism in question utilizes the first bit in field 95, which is referred to as the security bit. When this bit is a "1", the adaptive office control units and adaptive multijunction units are restricted from executing the commands specified in field 92 of the loop frame. To assure that a user cannot set the security bit to a "0", the adaptive office control units force this bit to a "1" when the adaptive digital service unit blocked data is passed through an adaptive office control unit. Secure commands, i.e., those which require a security bit of "0", can only be sent from internal devices (adaptive office control units and adaptive multijunction units) in the telephone system computer network. Whenever an internal device receives a command from its system control port, the device sets the security bit to "0" for the frame containing the command in question.

If an adaptive digital service unit inserts a secure command into a loop frame in response to commands on its system control port, the internal devices in the telephone system computer network will not execute the command, since even if the adaptive digital service unit changes the security bit to a "0", the adaptive office control unit receiving the loop frame information forces the security bit to a "1". However, an adaptive digital service unit receiving a secure command will execute the command, since adaptive digital service units do not check the security bit. Hence, the user can always check the observed data rates through the entire system, since this information is available from the far end adaptive digital service unit.

Examples of secure commands are commands that reset the internal devices in the telephone system, commands that enable the 64 Kbits/sec transmission mode, and commands that enable a second group of commands that are referred to as conditionally secure commands. If a user wishes to utilize the conditionally secure commands, the user must do so by transmitting the request to the telephone company. A telephone system technician then issues a secure command that enables the commands in question.

Conditionally secure commands are commands that may be enabled for a given network by the telephone company. Once enabled, the user can use these commands. Such commands are useful for restricting service to computer networks that have subscribed to only part of the available computer network services. Examples of such commands are commands that read the status of various internal devices, e.g., adaptive office control units and adaptive multijunction units, commands that place the various internal devices in loopback modes for testing, and commands that reconfigure the $T_1$ interface units for testing purposes. This last group of commands will be discussed in more detail below.

Conditionally secure commands are implemented utilizing the above discussed security bit and a security flag in each network unit. Each network unit has a security flag consisting of a one-bit storage cell. There is one such flag for each feature that may be triggered by a conditionally secure command. If a network unit's security flag for a particular option is set to a "1", the network unit will ignore a conditionally secure command sent to it. If the security flag is a "0", the command will be executed. The security flags of the various network units are set and reset by a group of secure commands. Hence, when a user subscribes to a particular service such as user enabled testing, a secure command enabling the security flag in the relevant internal devices is sent by a telephone company technician.

Rules Governing the Execution of Network Commands

The various network units in a computer network, i.e., the adaptive digital service units, the adaptive multijunction unit, the adaptive office control units, and the $T_1$ interface unit must remain synchronized for the computer network to operate correctly. To reduce the chance that erroneous commands may cause one or more of the devices to operate in a mode that will destroy this synchrony, the following three rules are observed. First, a network unit ignores all undefined or inappropriate commands. The network unit also ignores any command that might have been modified by a transmission error. If the 5 error correcting bits in the element 73 containing the command indicate that a transmission error has occurred during the transmission of said element, the command is ignored.

Second, the time at which a given command is executed is determined by the microprocessor present in the network unit. The ACTIVATE and DEACTIVATE commands must be executed as soon as possible after the command and address bytes are received. All other commands must wait until the complete frame is received before executing the commands.

Third, all network units, including the $T_1$ interface units of the present invention, respond to a STATUS command with the address assigned to the unit and the status of unit. This command may be used to verify that a previously sent command was properly executed.

Initialization

Upon being powered up or reset, the $T_1$ interface unit of the present invention assumes a default state in which data is transmitted and received in the framed data mode at a default data rate which is preferably 2.4 Kbits/sec. At this point, the $T_1$ interface unit does not have an assigned address. The $T_1$ interface unit may be assigned an address by a command from its command port or by receiving a frame that includes an ADDR_ASSIGN command and an address to be assigned. If the $T_1$ interface unit receives such a frame when it has not yet been assigned an address, it does not pass the frame on to the network units connected to it. Instead, it assumes the address given in the command.

Once the $T_1$ interface unit has acquired an address in this manner, it ignores all other ADDR_ASSIGN commands. That is, it transmits the frames containing the command, since the command is not addressed to it.

As noted above, each network unit, including the $T_1$ interface unit, responds to a STATUS command by sending a frame which includes an ACK command and data specifying the unit's type (i.e., $T_1$ interface unit, adaptive digital service unit, adaptive multijunction unit, or adaptive office control unit), address, and status.

It should be noted that, with the exception of the RESET command, all the ADDR_ADDRESS and STATUS commands used can be executed from the command port of any device in the computer network. Hence, a user can ascertain the topology and addresses assigned within the computer network at any time, assuming that the user has been given access to this service, i.e., that the security flags in the various devices have been appropriately set. Furthermore, the user can assign his own addresses to the network units within the telephone system computer network if the user so desires. This feature is particularly well suited to users who maintain their own network using software executed from an adaptive digital service unit within the network.

Data Rate Changes

The speed at which data is transferred within the telephone system computer network is determined by SET_RATE commands. Such commands may be generated by a system controller connected to the command port of any device in the computer network or by the adaptive digital service unit connected to the master computer. Since a $T_1$ interface unit operates on data from $T_1$ communication links, the rate at which data is received and transmitted remains the same; however a SET_RATE command has the effect of changing the number of copies of each data byte present in the framed data mode. Hence, a $T_1$ interface unit according to the present invention responds to SET_RATE commands by adjusting the number of copies utilized by repeater 478 and majority decision logic 477 shown in FIG. 6.

A separate conditionally secure command is used to change the telephone system computer network to the 64 Kbits/sec unframed mode. After entering this mode, a $T_1$ interface unit can only execute a single command which causes it to resume operation in the framed data mode. When in the unframed mode, the $T_1$ interface unit scans for a specific sequence of bytes which signal that it should return to the framed data mode.

Synchronization

Since there are a number of possible operating speeds in the telephone system computer network, a $T_1$ interface unit according to the present invention can determine the operating speed of the telephone system computer network and resynchronize with it. The problem of network units operating at different speeds can arise when a network unit receives a SET_RATE command that is garbled by noise. Although this problem is primarily encountered when the telephone system computer network is operating in the adaptive mode, i.e., when the operating speed is being set in response to observed error rates, it can also occur in other modes, i.e., when a new $T_1$ interface unit is plugged into the telephone system computer network while the computer network is operating at a fixed rate.

In a computer network utilizing the present invention, this problem is solved as follows. All network units, including the $T_1$ interface units, determine the system rate, i.e., the rate of the master adaptive digital service unit, and adjust themselves to that rate. When a network unit is out of synchronization for a predetermined period of time, it begins a scanning process to determine the system rate. The source of the data that the network unit scans in its attempt to determine the system rate depends on the type of network unit and whether the network unit is coupled to the master computer in the computer network. If the device is an $T_1$ interface unit, it continues to pass data as previously, and, after detecting that it does not know the system rate, it searches for the new rate until it resynchronizes using the algorithm described below. The $T_1$ interface unit scans to determine the system rate on the $T_1$ channels closest to the master adaptive digital service unit.

A $T_1$ interface unit detects that it does not know the system rate when it has failed to detect the Barker synchronization code in a predetermined number of bytes. When a $T_1$ interface unit master data port has seen a sufficient number of data bytes to conclude that it should have seen the Barker code if the system speed was correct, it assumes that synchronization has been lost. The number of data bytes searched may differ for different data rates. Typically, this number is at least 3000 bytes in the preferred embodiment of the present invention.

Once the $T_1$ interface unit detects that it does not know the system rate, it performs a search at the various possible system rates until it finds the Barker code at one of them. At each new rate, the $T_1$ interface unit searches for the Barker code. After a predetermined number of bytes have been examined without finding the Barker code, the $T_1$ interface unit selects the next lowest speed and repeats the process. If it is already at the lowest speed, it selects 38.4 Kbits/sec for the next speed. Hence, the $T_1$ interface unit will continue to cycle through all of the possible data rates until it finds the correct one.

Loopbacks

Each of the network units, including the $T_1$ interface units, in the telephone system computer network includes loopback capabilities in the preferred embodiment of the present invention. When placed in loopback mode, data entering the $T_1$ interface unit on an input line thereto is copied to an output line thereof. The point at which the data is transferred determines the type of loopback. In a "near" loopback, the data entering a data port is copied back to the output line of the data port at the entrance point to the data port. For example, a near loopback of $T_1$ interface unit 470 in response to a command received on lines 472a and 472b shown in FIG. 5 would be accomplished by closing switches 481 and/or 482, and would result in the data not passing through the encryption and decryption circuitry. In a "far" loopback, the data is copied back at the point at which the data would normally leave the $T_1$ interface unit; a far loopback of T, interface unit 470 would be accomplished by closing switch 485. Loopbacks are initiated and cancelled by specific system commands similar to those described above.

Command Execution

Referring again to FIG. 5, the microprocessor in each port monitors both the data stream leaving majority decision circuit 477 and the data stream entering repeater 478 to determine if a command intended for the port in question is present on either of the data streams. In addition, new command data may be inserted into repeater 478 if the microprocessor has been instructed to insert a command into the next frame leaving the data port.

As noted above, a $T_1$ interface unit according to the present invention will automatically search for the correct data rate if it does not see the Barker synchronization code within a specified number of bytes.

FIG. 7 is a flow chart of the command execution cycle of the microprocessor monitoring the data leaving the unit on line 486 shown in FIG. 5. The microprocessor searches for the Barker synchronization code which begins each data frame as shown at 802. If more than N bytes are seen without finding the Barker code, the microprocessor initiates a search for the correct system rate as discussed above and as shown at 804 and 806. When the Barker code is found, the microprocessor extracts the command and address data as shown at 808. These data immediately follow the Barker code. The microprocessor also examines the ECC bits in the frame elements containing the command and address data to determine if transmission errors have occurred as shown at 810. If no transmission errors have occurred, the microprocessor compares the address in the command data with the address assigned to the $T_1$ interface unit, as shown at 812. If the addresses match, the command is stored for execution at the end of the reception of the current frame as shown at 814. If the command data included transmission errors, the command is ignored.

The command data as well as the rest of the frame are copied to the output line 486. When the microprocessor sees the last byte of the frame, it executes any stored commands as shown at 818 and 820.

If data is to be inserted into an outgoing frame, the microprocessor interrupts the flow of data entering the repeater 478 and inserts the new data. The normal flow of data is then re-established.

Accordingly, a $T_1$ interface unit has been described. While preferred embodiments of the invention have been illustrated and described above, there is no intent to limit the scope of the invention to these or any other specific embodiments. The scope of the invention is defined by the spirit and language of the appended claims.

What is claimed is:

1. An interface unit for transferring digital data between a first channel having incoming and outgoing lines on a first time-domain multiplexed communication link and a channel having incoming and outgoing lines on a central office time-domain multiplexed communication link of a multipoint communication network which includes a plurality of network units with at least two of said network units comprising said interface units, said network units coupled to telephone system communication links and communicating with each other on said communication links, each said network unit comprising means for transmitting and receiving digital data in a frame mode in which said data is organized into frames on said communication links, each said frame including synchronization data, command data, error correcting data, and user data, each said network unit further comprising:

means for storing an address identifying said network unit;

means for receiving commands from other network units in said computer network, said commands being specified by command data in one of said frames received by said network unit;

means for generating command data in response to a received command included in said command data;

means for transmitting commands to other network units in said computer network, said transmitting means comprising means for inserting command data generated by said command data generating means into one of said frames transmitted by said network unit; and means for executing a command specifying said stored address as the target thereof, said command being specified by said command data received in one of said frames received by said receiving means;

said interface unit comprising:

control means including means for storing an address identifying said interface unit;

means for receiving commands from other network units including means for receiving frames generated by one of said network units in said computer network, said commands being specified by command data in one of said frames received by said interface unit;

means for generating command data in response to a received command included in said command data;

means for transmitting commands to other network units in said computer network, said transmitting means comprising means for inserting command data generated by said command data generating means into one of said frames and means for transmitting said frame; and means for executing a command specifying said stored address as the target thereof, said command being specified by said command data received in one of said frames received by said receiving means;

decryptor means including first input port means coupled to the incoming line of said first channel for receiving a primary channel word, said decryptor means further comprising first decrypting means for generating a data word corresponding to each said received primary channel word, each said generated data word comprising a portion of one of said received frames;

encryptor means including first output port means coupled to said outgoing line of said first channel for receiving a said data word, said encryptor means further comprising first encrypting means for generating a said primary channel word from said received data word and for transmitting said generated primary channel word on the said outgoing line of said first channel, wherein said decryptor means further comprises second output port means, coupled to the outgoing line of said central office time-domain multiplex communication link, for transmitting each said data word generated by said first decrypting means on said outgoing line of said central office communication link, and wherein said encryptor means further comprises second input port means for receiving a data word on said incoming line of said central office communication link and coupling said data word to said first output port means.

2. The interface unit of claim 1 wherein said first decrypting means comprises means for copying the bits of said channel word to the corresponding bits of said data word, and wherein said first encrypting means comprises means for copying the bits of said data word to the corresponding bits of said channel word.

3. An interface unit for transferring digital data between a first channel having incoming and outgoing lines on a first time-domain multiplexed communication link and a channel having incoming and outgoing lines on a central office time-domain multiplexed communication link of a multipoint communication network which includes a plurality of network units with at least two of said network units comprising said interface units, said network units coupled to telephone system communication links and communicating with each other on said communication links, each said network unit comprising means for transmitting and receiving digital data in a frame mode in which said data is organized into frames on said communication links, each said frame including synchronization data, command data, error correcting data, and user data, each said network unit further comprising:

means for storing an address identifying said network unit;

means for receiving commands from other network units in said computer network, said commands being specified by command data in one of frames received by said network unit;

means for generating command data in response to a received command included in said command data;

means for transmitting commands to other network units in said computer network, said transmitting means comprising means for inserting command data generated by said command data generating means into one of said frames transmitted by said network unit; and means for executing a command specifying said stored address as the target thereof, said command being specified by said command data received in one of said frames received by said receiving means;

said interface unit comprising:

control means including means for storing an address identifying said interface unit;

means for receiving commands from other network units including means for receiving frames generated by one of said network units in said computer network, said commands being specified by command data in one of said frames received by said interface unit;

means for generating command data in response to a received command included in said command data;

means for transmitting commands to other network units in said computer network, said transmitting means comprising means for inserting command data generated by said command data generating means into one of said frames and means for transmitting said frame; and means for executing a command specifying said stored address as the target thereof, said command being specified by said command data received in one of said frames received by said receiving means;

decryptor means including first input port means coupled to the incoming line of said first channel for receiving a primary channel word, said decryptor means further comprising first decrypting means for generating a data word corresponding to each said received primary channel word, each said generated data word comprising a portion of one of said received frames;

encryptor means including first output port means coupled to said outgoing line of said first channel for receiving a said data word, said encryptor means further comprising first encrypting means for generating a said primary channel word from said received data word and for transmitting said generated primary channel word on the said outgoing line of said first channel, wherein said decryptor means further comprises second output port means, coupled to the outgoing line of said central office time-domain multiplex communication link, for transmitting each said data word generated by said first decrypting means on said outgoing line of said central office communication link, and wherein said encryptor means further comprises second input port means for receiving a data word on said incoming line of said central office communication link and coupling said data word to said first output port means, wherein said first input port means further comprises:

means for coupling said first input port means to a second incoming channel on said first time-domain multiplexed communication link;

means for receiving a secondary channel word on said second incoming channel; and second decrypting means for combining said secondary channel word with the primary channel word to form a second data word said second data word replacing said data word generated by said first decrypting means, and wherein said first output port means further comprises:

means for coupling said first output port means to a second outgoing channel on said first time-domain multiplexed communication link;

second encrypting means for generating primary and secondary channel words from one of said received data words and for transmitting said primary and secondary channel words respectively on said first and second outgoing channels coupled thereto, and wherein said interface unit further comprises:

means responsive to a predetermined said command for determining which of said second encrypting means and second decrypting means or said first encrypting means and first decrypting means are operative.

4. The interface unit of claim 3 wherein said second decrypting means comprises means for decrypting two error encrypted words using an error correcting code, and wherein said second encrypting means comprises means for encrypting said data word using said error correcting code.

5. The interface unit of claim 1 wherein said first input port means further comprises error detecting means for detecting transmission errors in said received frame, said error detecting means utilizing said error correcting data included in said frame.

6. The interface unit of claim 5 wherein said error detecting means further comprises means for determining the rate at which errors are detected thereby and means, responsive to a predetermined one of said commands, for inserting data specifying said error rate into said command data of one of said frames transmitted by said command transmitting means.

7. The interface unit of claim 5 wherein said first input port means further comprises means for preventing said command executing means from executing of said commands received in one of said frames for which one of said error detecting means detected a transmission error.

8. The interface unit of claim 1 further comprising command port means for receiving commands to be executed by said interface unit or by another network unit, each said command to be executed by another network unit being transmitted in said command data of one of said frames transmitted by said command transmitting means.

9. An interface unit for transferring digital data between a first channel having incoming and outgoing lines on a first time-domain multiplexed communication link and a channel having incoming and outgoing lines on a central office time-domain multiplexed communication link of a multipoint communication network which includes a plurality of network units with at least two of said network units comprising said interface units, said network units coupled to telephone system communication links and communicating with each other on said communication links, each said network unit comprising means for transmitting and receiving digital data in a frame mode in which said data is organized into frames on said communication links, each said frame including synchronization data, command data, error correcting data, and user data, each said network unit further comprising:

means for storing an address identifying said network unit;

means for receiving commands from other network units in said computer network, said commands being specified by command data in one of frames received by said network unit;

means for generating command data in response to a received command included in said command data;

means for transmitting commands to other network units in said computer network, said transmitting means comprising means for inserting command data generated by said command data generating means into one of said frames transmitted by said network units; and means for executing a command specifying said stored address as the target thereof, said command being specified by said command data received in one of said frames received by said receiving means;

said interface unit comprising:

control means including means for storing an address identifying said interface unit;

means for receiving commands from other network units including means for receiving frames generated by one of said network units in said computer network, said commands being specified by command data in one of said frames received by said interface unit;

means for generating command data in response to a received command included in said command data;

means for transmitting commands to other network units in said computer network, said transmitting means comprising means for inserting command data generated by said command data generating means into one of said frames and means for transmitting said frame; and means for executing a command specifying said stored address as the target thereof, said command being specified by said command data received in one of said frames received by said receiving means;

decryptor means including first input port means coupled to the incoming line of said first channel for receiving a primary channel word, said decryptor means further comprising first decrypting means for generating a data word corresponding to each said received primary channel word, each said generated data word comprising a portion of one of said received frames;

encryptor means including first output port means coupled to said outgoing line of said first channel for receiving a said data word, said encryptor means further comprising first encrypting means for generating a said primary channel word from said received data word and for transmitting said generated primary channel word on the said outgoing line of said first channel, wherein said decryptor means further comprises second output port means, coupled to the outgoing line of said central office time-domain multiplex communication link, for transmitting each said data word generated by said first decrypting means on said outgoing line of said central office communication link, and wherein said encryptor means further comprises second input port means for receiving a data word on said incoming line of said central office communication link and coupling said data word to said first output port means, wherein said first input and said first output port means further comprise means for setting the rate at which said input port means receives said primary channel word and said output port means transmits said primary channel word, said rate being selected from a plurality of loop data rates, wherein said rate setting means is responsive to one of said received commands.

10. The interface unit of claim 9 wherein said first decrypting means further comprises means for combining a predetermined number of successively received channel words utilizing majority decision logic to form said data word, said predetermined number being determined by said data rate and wherein said first encrypting means further comprises means for generating said predetermined number of successive channel words by repeating each said encrypted channel word a predetermined number of times.

11. The interface unit of claim 1 further comprising means for transmitting and receiving data in a non-frame mode in which said first input port means receives channel words at a predetermined loop data rate and said first output data port transmits channel words at said predetermined loop data rate, said first input port means further comprising means for detecting a switch sequence comprising a predetermined sequence of data words, said interface unit entering said non-frame mode in response to a predetermined one of said commands, and said interface unit resuming transmission in said frame mode upon detecting said switch sequence by said detecting means.

12. The interface unit of claim 1 further comprising means responsive to a predetermined said command and a predetermined value for said stored address, for causing said stored address to match an address specified in 13. An interface unit for transferring digital data between a first channel having incoming and outgoing lines on a first time-domain multiplexed communication link and a channel having incoming and outgoing lines on a central office time-domain multiplexed communication link of multipoint communication network which includes a plurality of network units with at least two of said network units comprising said interface units, said network units coupled to telephone system communication links and communicating with each other on said communication links, each said network unit comprising means for transmitting and receiving digital data in a frame mode in which said data is organized into frames on said communication links, each said frame including synchronization data, command data, error correcting data, and user data, each said network unit further comprising:

means for storing an address identifying said network unit;

means for receiving commands from other network units in said computer network, said commands being specified by command data in one of frames received by said network unit;

means for generating command data in response to a received command included in said command data;

means for transmitting commands to other network units in said computer network, said transmitting means comprising means for inserting command data generated by said command data generating means into one of said frames transmitted by said network unit; and means for executing a command specifying said stored address as the target thereof, said command being specified by said command data received in one of said frames received by said receiving means;

said interface unit comprising:

control means including means for storing an address identifying said interface unit;

means for receiving commands from other network units including means for receiving frames generated by one of said network units in said computer network, said commands being specified by command data in one of said frames received by said interface unit;

means for generating command data in response to a received command included in said command data;

means for transmitting commands to other network units in said computer network, said transmitting means comprising means for inserting command data generated by said command data generating means into one of said frames and means for transmitting said frame; and means for executing a command specifying said stored address as the target thereof, said command being specified by said command data received in one of said frames received by said receiving means;

decryptor means including first input port means coupled to the incoming line of said first channel for receiving a primary channel word, said decryptor means further comprising first decrypting means for generating a data word corresponding to each said received primary channel word, each said generated data word comprising a portion of one of said received frames;

encryptor means including first output port means coupled to said outgoing line of said first channel for receiving a said data word, said decryptor means further comprising first encrypting means for generating a said primary channel word from said received data word and for transmitting said generated primary channel word on the said outgoing line of said first channel, wherein said decryptor means further comprises second output port means, coupled to the outgoing line of said central office time-domain multiples communication link, for transmitting each said data word generated by said first decrypting means on said outgoing line of said central office communication link, and wherein said encryptor means further comprises second input port means for receiving a data word on said incoming line of said central office communication link and coupling said data word to said first output port means, said interface unit further comprising means responsive to a first predetermined command, for causing each said channel word transmitted by said first output port means to be copied to said first input port means until a second predetermined command is received by said interface unit.

* * * * *

UNITED STATES PATENT AND TRADEMARK OFFICE
CERTIFICATE OF CORRECTION

PATENT NO. : 5,058,163

DATED : October 15, 1991

INVENTOR(S) : Lubarsky, et al.

It is certified that error appears in the above-identified patent and that said Letters Patent is hereby corrected as shown below:

Title page:

Item [75] Inventors: delete "Freemont" and insert therefor --Fremont--.

Column 7, line 25, delete "unti" and insert therefor --unit--.

Column 19, line 44, delete "generated" and insert therefor --generate--.

Column 19, line 47, after "first" insert --bit--.

Column 32, line 41, delete "units" and insert therefor --unit--.

Column 33, line 63, after "in" insert --said command--.

Column 34, line 65, delete "decryptor" and insert therefor --encryptor--.

Table II, under the column Data Word, delete first number "1" and insert therefor --0--.

Table II, table line 113, under the heading Improved Error Correcting Code, 1y, column 1, delete "2" and insert therefor --1--.

UNITED STATES PATENT AND TRADEMARK OFFICE
CERTIFICATE OF CORRECTION

PATENT NO. : 5,058,163

DATED : October 15, 1991

INVENTOR(S) : Lubarsky, et al.

It is certified that error appears in the above-identified patent and that said Letters Patent is hereby corrected as shown below:

Table II, table line 196, under the heading Improved Error Correcting Code, 1y, column 1, delete "1" and insert therefor --0--.

Table II, table line 196, under the heading Improved Error Correcting Code, 1y, column 7, delete "0" and insert therefor --1--.

Table II, table line 196, under the heading Improved Error Correcting Code, 1y, column B, delete "1" and insert therefor --0--.

Table II, table line 212, under the heading Standard Error Correcting Code, 2x, column E, delete "2" and insert therefor --1--.

Table II, table line 212, under the heading Improved Error Correcting Code, 2y, column 3, delete "2" and insert therefor --1--.

Table II, table line 212, under the heading Improved Error Correcting Code, 2y, column 5, delete "2" and insert therefor --1--.

UNITED STATES PATENT AND TRADEMARK OFFICE
CERTIFICATE OF CORRECTION

PATENT NO. : 5,058,163

DATED : October 15, 1991

INVENTOR(S) : Lubarsky, et al.

It is certified that error appears in the above-identified patent and that said Letters Patent is hereby corrected as shown below:

Column 10, line 12 delete "sequences" and insert therefor --sequence--.

Column 25, line 44 after "of" insert --the--.

Column 30, line 22 after "of" insert --said--.

Column 32, line 32 after "of" insert --said--.

Column 34, line 17 after "of" insert --said--.

Signed and Sealed this

Sixth Day of July, 1993

Attest:

MICHAEL K. KIRK

*Attesting Officer*   Acting Commissioner of Patents and Trademarks